United States Patent

Cass et al.

[11] Patent Number: 5,946,414
[45] Date of Patent: Aug. 31, 1999

[54] ENCODING DATA IN COLOR IMAGES USING PATTERNED COLOR MODULATED IMAGE REGIONS

[75] Inventors: Todd A. Cass, San Francisco, Calif.; Xin Tong, Jacksonville, Fla.

[73] Assignee: Xerox Corporation, Stamford, Conn.

[21] Appl. No.: 09/162,119

[22] Filed: Aug. 28, 1998

[51] Int. Cl.⁶ .................................................. G06K 9/00
[52] U.S. Cl. .......................................................... 382/183
[58] Field of Search ........................... 382/100, 162, 382/183; 235/454, 462, 465, 469, 494

[56] References Cited

U.S. PATENT DOCUMENTS

| | | | |
|---|---|---|---|
| 4,443,695 | 4/1984 | Sanford | 235/465 |
| 5,221,833 | 6/1993 | Hecht | 235/494 |
| 5,245,165 | 9/1993 | Zhang | 235/454 |
| 5,278,400 | 1/1994 | Appel | 235/494 |
| 5,315,098 | 5/1994 | Tow | 235/494 |
| 5,369,261 | 11/1994 | Shamir | 235/469 |
| 5,619,026 | 4/1997 | Chou et al. | 235/462 |
| 5,684,885 | 11/1997 | Cass et al. | 382/100 |

FOREIGN PATENT DOCUMENTS

| | | |
|---|---|---|
| 63-254586 | 10/1988 | Japan . |
| WO 95/14289 | 5/1995 | WIPO . |

OTHER PUBLICATIONS

Cox, I. J.; Killian, J.; Leighton, T.; Shamoon, T. Secure Spread Spectrum Watermarking for Multimedia. NEC Research Institute, Technical Report 95–10, pp. 1–33.

Antognini, T.; Antognini, W. A Flexibly Configurable 2D Bar Code. pp. 1–26. http://www.paperdisk.com/ibippa-pr.htm.

Aurora bar code technologies ltd. Two–Dimensional Bar Codes. The Biggest Advance in Bar Code Technology in Recent Years. *Code Facts.* pp. 1–2. http://www.dimension--x.com/cf-2d.htm.

Johnston, R.B.; Yap, A. K. C. Two Dimensional Bar Code as a Medium for Electronic Data Interchange. *Two Dimensional Bar Code.* pp. 1–10. http://www.bs.monash.edu.au/staff/johno/BARCOPAW.html.

Nelson, B. Secret Codes? *Automatic I.D. News.* pp. 1–2. http://www.autoidnews.com/technologies/concepts/secret.htm.

The 'Big 3' Dominate 2D Symboloty Use. *Automatic I.D. News.* pp. 1–2. http://www.autoidnews.com/technologies/concepts/big3.htm.

*Primary Examiner*—Jose L. Couso

[57] ABSTRACT

Message values included in a set of valid message values that constitute a coding scheme are each encoded in an image region, called an encoded signal block, composed of a spatially arranged pattern of colored sub-regions. The colored sub-regions have color values produced by modulating a reference color value by a color change quantity expressed as a color space direction in a multi-dimensional color space such that the average color of all of the sub-region colors is the reference color. There is a unique pattern of color-modulated sub-regions for each valid message value in the coding scheme. In one embodiment, the color space direction is computed to be simultaneously detectable by a digital image capture device such as a scanner and substantially imperceptible to a human viewer, so that the embedded data represented by the pattern of color modulations are visually imperceptible in the encoded signal block. When the reference color is determined to be the average color of an image region in an original color image, the encoded signal block may replace the image region in the original image, producing an encoded image version of the original image having little or no image degradation. In this case, the original image colors become carriers of the encoded data. Signal blocks may be arranged to encode data in only one dimension in an image, which allows for less complex decoding algorithms, or in a two dimensional array or grid-like structure, which allows for a high encoded data density rate.

20 Claims, 22 Drawing Sheets

*Image with encoded message, E*

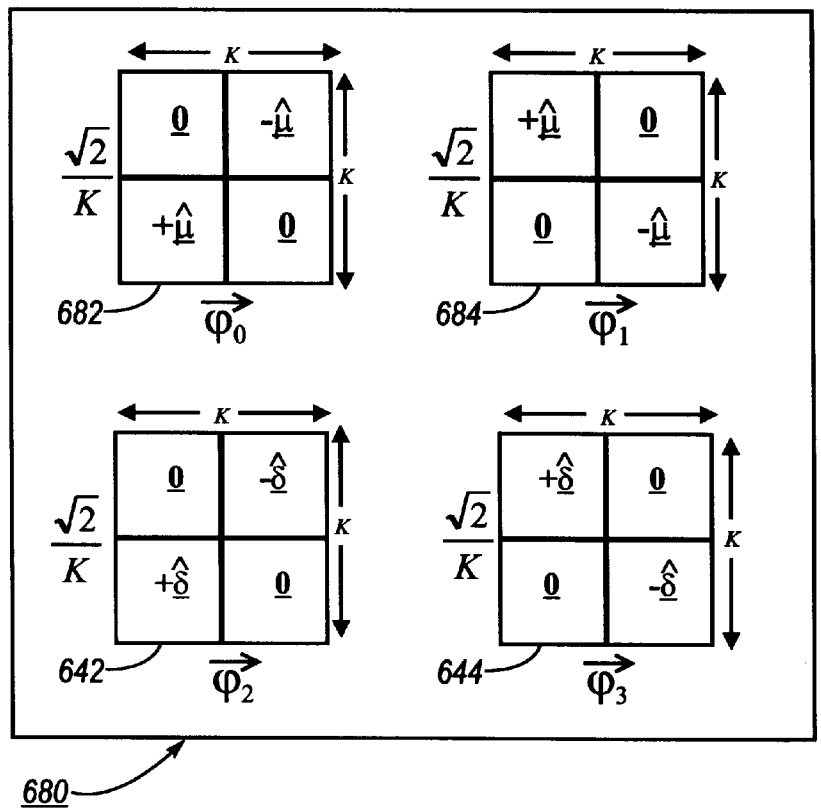

FIG. 35

$\underline{s}_0 = [+1 \ +1 \ +1 \ +1]^t \leftrightarrow \vec{s}_0 = (+1)\vec{\varphi}_0 + (+1)\vec{\varphi}_1 + (+1)\vec{\varphi}_2 + (+1)\vec{\varphi}_3$ $\underline{s}_1 = [+1 \ +1 \ +1 \ -1]^t \leftrightarrow \vec{s}_1 = (+1)\vec{\varphi}_0 + (+1)\vec{\varphi}_1 + (+1)\vec{\varphi}_2 + (-1)\vec{\varphi}_3$ $\underline{s}_2 = [+1 \ +1 \ -1 \ +1]^t \qquad \underline{s}_{10} = [-1 \ +1 \ -1 \ +1]^t$ $\underline{s}_3 = [+1 \ +1 \ -1 \ -1]^t$

⋮ ⋮

$\underline{s}_{14} = [-1 \ -1 \ -1 \ +1]^t$ $\underline{s}_9 = [-1 \ +1 \ +1 \ -1]^t \qquad \underline{s}_{15} = [-1 \ -1 \ -1 \ -1]^t$

FIG. 36

$$\underline{s}_0 = +\frac{\sqrt{2}}{K}\begin{array}{|c|c|}\hline \underline{0} & -\hat{\underline{\mu}} \\\hline +\hat{\underline{\mu}} & \underline{0} \\\hline\end{array} + \frac{\sqrt{2}}{K}\begin{array}{|c|c|}\hline +\hat{\underline{\mu}} & \underline{0} \\\hline \underline{0} & -\hat{\underline{\mu}} \\\hline\end{array} +$$

$$\frac{\sqrt{2}}{K}\begin{array}{|c|c|}\hline \underline{0} & -\hat{\underline{\delta}} \\\hline +\hat{\underline{\delta}} & \underline{0} \\\hline\end{array} + \frac{\sqrt{2}}{K}\begin{array}{|c|c|}\hline +\hat{\underline{\delta}} & \underline{0} \\\hline \underline{0} & -\hat{\underline{\delta}} \\\hline\end{array} = \begin{array}{|c|c|}\hline +\underline{\mu}+\underline{\delta} & -\underline{\mu}-\underline{\delta} \\\hline +\underline{\mu}+\underline{\delta} & -\underline{\mu}-\underline{\delta} \\\hline\end{array}$$

FIG. 37

$$\underline{s}_9 = -\frac{\sqrt{2}}{K}\begin{array}{|c|c|}\hline \underline{0} & -\hat{\underline{\mu}} \\\hline +\hat{\underline{\mu}} & \underline{0} \\\hline\end{array} + \frac{\sqrt{2}}{K}\begin{array}{|c|c|}\hline +\hat{\underline{\mu}} & \underline{0} \\\hline \underline{0} & -\hat{\underline{\mu}} \\\hline\end{array} +$$

$$\frac{\sqrt{2}}{K}\begin{array}{|c|c|}\hline \underline{0} & -\hat{\underline{\delta}} \\\hline +\hat{\underline{\delta}} & \underline{0} \\\hline\end{array} - \frac{\sqrt{2}}{K}\begin{array}{|c|c|}\hline +\hat{\underline{\delta}} & \underline{0} \\\hline \underline{0} & -\hat{\underline{\delta}} \\\hline\end{array} = \begin{array}{|c|c|}\hline +\underline{\mu}-\underline{\delta} & +\underline{\mu}-\underline{\delta} \\\hline -\underline{\mu}+\underline{\delta} & -\underline{\mu}+\underline{\delta} \\\hline\end{array}$$

FIG. 38

$\underline{s}_0 = \begin{array}{|c|c|} \hline +\mu +\underline{\delta} & -\mu -\underline{\delta} \\ \hline +\mu +\underline{\delta} & -\mu -\underline{\delta} \\ \hline \end{array}$
692

$\underline{s}_5 = \begin{array}{|c|c|} \hline -\mu -\underline{\delta} & -\mu -\underline{\delta} \\ \hline +\mu +\underline{\delta} & +\mu +\underline{\delta} \\ \hline \end{array}$ $\underline{s}_{10} = \begin{array}{|c|c|} \hline +\mu +\underline{\delta} & +\mu +\underline{\delta} \\ \hline -\mu -\underline{\delta} & -\mu -\underline{\delta} \\ \hline \end{array}$

698

$\underline{s}_1 = \begin{array}{|c|c|} \hline +\mu -\underline{\delta} & -\mu -\underline{\delta} \\ \hline +\mu +\underline{\delta} & -\mu +\underline{\delta} \\ \hline \end{array}$ $\underline{s}_6 = \begin{array}{|c|c|} \hline -\mu +\underline{\delta} & -\mu +\underline{\delta} \\ \hline +\mu -\underline{\delta} & +\mu -\underline{\delta} \\ \hline \end{array}$ $\underline{s}_{11} = \begin{array}{|c|c|} \hline +\mu -\underline{\delta} & +\mu +\underline{\delta} \\ \hline -\mu -\underline{\delta} & -\mu +\underline{\delta} \\ \hline \end{array}$ $\underline{s}_2 = \begin{array}{|c|c|} \hline +\mu +\underline{\delta} & -\mu +\underline{\delta} \\ \hline +\mu -\underline{\delta} & -\mu -\underline{\delta} \\ \hline \end{array}$ $\underline{s}_7 = \begin{array}{|c|c|} \hline -\mu -\underline{\delta} & -\mu +\underline{\delta} \\ \hline +\mu -\underline{\delta} & +\mu +\underline{\delta} \\ \hline \end{array}$ $\underline{s}_{12} = \begin{array}{|c|c|} \hline -\mu +\underline{\delta} & +\mu -\underline{\delta} \\ \hline -\mu +\underline{\delta} & +\mu -\underline{\delta} \\ \hline \end{array}$ $\underline{s}_3 = \begin{array}{|c|c|} \hline +\mu -\underline{\delta} & -\mu +\underline{\delta} \\ \hline +\mu -\underline{\delta} & -\mu +\underline{\delta} \\ \hline \end{array}$ $\underline{s}_8 = \begin{array}{|c|c|} \hline +\mu +\underline{\delta} & +\mu -\underline{\delta} \\ \hline -\mu +\underline{\delta} & -\mu -\underline{\delta} \\ \hline \end{array}$ $\underline{s}_{13} = \begin{array}{|c|c|} \hline -\mu -\underline{\delta} & +\mu -\underline{\delta} \\ \hline -\mu +\underline{\delta} & +\mu +\underline{\delta} \\ \hline \end{array}$ $\underline{s}_{15} = \begin{array}{|c|c|} \hline -\mu -\underline{\delta} & +\mu +\underline{\delta} \\ \hline -\mu -\underline{\delta} & +\mu +\underline{\delta} \\ \hline \end{array}$ $\underline{s}_4 = \begin{array}{|c|c|} \hline -\mu +\underline{\delta} & -\mu -\underline{\delta} \\ \hline +\mu +\underline{\delta} & +\mu -\underline{\delta} \\ \hline \end{array}$ $\underline{s}_9 = \begin{array}{|c|c|} \hline +\mu -\underline{\delta} & +\mu -\underline{\delta} \\ \hline -\mu +\underline{\delta} & -\mu +\underline{\delta} \\ \hline \end{array}$
696

$\underline{s}_{14} = \begin{array}{|c|c|} \hline -\mu +\underline{\delta} & +\mu +\underline{\delta} \\ \hline -\mu -\underline{\delta} & +\mu -\underline{\delta} \\ \hline \end{array}$

FIG. 39

ENCODING DATA IN COLOR IMAGES USING PATTERNED COLOR MODULATED IMAGE REGIONS

CROSS-REFERENCE TO OTHER APPLICATIONS

The subject matter disclosed in this application is related to subject matter disclosed in a concurrently filed, commonly-assigned U.S. patent application Ser. No. 09/162,257 filed Sep. 28, 1998 by the same inventor entitled "Decoding Data from Patterned Color Modulated Image Regions in a Color Image", which is incorporated by reference herein for all that it teaches as if set out in full. The subject matter disclosed in this application may also be related to subject matter disclosed in U.S. patent application Ser. No. 08/956,326, entitled "Determining An Optimal Color Space Direction For Selecting Color Modulations", which is incorporated by reference herein for all that it teaches as if set out in full.

BACKGROUND OF THE INVENTION

The present invention relates generally to a processor-based technique in the fields of color image processing and information encoding, and, more particularly, to a technique for encoding digital data into an image using image regions that are composed of multicolored subregions arranged in a pattern. The data may be encoded so that each image region has an overall visual appearance of an average color to the human viewer while the multi-colored subregions are substantially imperceptible, or not visually objectionable, and are simultaneously capable of detection by a digital image capture device for decoding purposes. When the multi-colored subregions are visually substantially imperceptible, the encoded data may be encoded into an original color image without causing noticeable image distortion or degradation, and when so encoded, a decoding operation is capable of recovering the encoded data from an encoded image without using the original image.

Bar codes are a well-known category of document or image marking techniques that have as their primary goal to densely encode digital information in a small image space without regard to how visible the encoded information is to a human viewer, and with the intent to reliable decode the information at a later time. Bar code images are typically attached to other objects and carry identifying information. U.S. Pat. No. 4,443,694, entitled "Multilevel Bar Code Reader" discloses a bar code reader for decoding a bar code using at least three levels of darkness. The bar code that encodes data consists of a plurality of bars, each of which has a particular level of darkness. The sequence of bars encodes a particular data string in a printed format. It is disclosed that in a particular embodiment of the invention, the transition from one darkness level to another second darkness level is indicative of the encoding of a predetermined value of a binary string. Each transition from bar to bar is translated into its appropriate dual set of bit strings to divulge the final binary string. In this embodiment five levels of darkness are utilized in the bar code, with each level having associated with it a certain degree of darkness including white, white-gray, gray, gray-black, and black.

U.S. Pat. No. 5,619,026, entitled "Grayscale Barcode Reading Apparatus System Including Translating Device for Translating a Pattern Image into a Sequence of Bar Widths and Transition Directions," discloses a system for verifying an object of interest that includes a grayscale one-dimensional bar pattern coupled to the object. The grayscale pattern includes vertical stripes of varying brightness and width, and is disclosed as being a hidden pattern. It is disclosed that the use of grayscale bar codes differs from standard practice which uses binary patterns. Decoding relies on detecting distinct transitions between gray scales at the edges of the bars.

Two-dimensional (2D) bar codes encode data in both the height and width of an encoded bar code image, and so store considerably more information than a linear, one-dimensional (1D) bar code. It is estimated that over a thousand alphanumeric characters can be placed in a single 2D bar code symbol the size of a large postage stamp. 2D bar codes typically have one of two designs: a stacked, or multi-row linear bar code, and a matrix or dot type bar code. The matrix type of 2D bar code is usually square and made up of a grid of small square cells which can be black or white. PDF417 is an example of a stacked 2D bar code. PDF417 has a very high data capacity and density: each symbol can code up to 2725 bytes of data at a density of about 300–500 bytes per square inch. DataMatrix is an example of a 2D matrix-type bar code that contains up to 2,335 characters per symbol. Symbols typically have 400–500 characters per square inch. Maxicode is an example of a dot-type 2D bar code that uses 888 data-carrying circular cells arranged around a bullseye; approximately 100 alphanumeric characters can be encoded in a square inch. Additional information on 2D bar codes may be found, for example, in an article by Johnston and Yap entitled "Two Dimensional Bar Code as a Medium for Electronic Data Interchange," Monash University (Clayton, Victoria) available as of the date of filing at http://www.bs.monash.edu.au/staff/johno/BARCOPAW.html.

In an article entitled "A Flexibly Configurable 2D Bar Code", available as of the date of filing at http://www.paperdisk.com/ibippapr.htm, Antognini and Antognini disclose a 2D symbol technology called PaperDisk™ that represents data by means of what is termed a "spot" or "cell". A spot is a typically rectangular array of dots, or printed pixels, laid down by a printer to represent a bit being "on". It is separated from adjoining spots (or places they might occupy) by designated vertical and horizontal distances. These distances are measured in terms of (typically) integral numbers of dots. A cell is a region allocated to a given potential spot. That is, it includes the spot itself (where the bit value calls for a spot) and extends halfway tot he edges of neighboring potential spots. Clocking features, called "markers" are rectangular arrays of dots arranged in vertical strips throughout a pattern. All encoded data plus landmarks and meta-information about the encoded information are collectively referred to as a data tile. Decoding proceeds by first finding a landmark, from which a preliminary estimate can be made of the scale and orientation of the features in the image, with the goal of finding the meta-information. When the meta-information is found it is decoded to produce data format parameter values for the data portion that follows. FIG. 2 illustrates a full data tile as a black and white image of a large number of small, rectangular dark marks. It would appear, then, from the disclosure that the PaperDisk™ technology is intended to produce an encoded image in which the encoded data is visible to a human viewer.

There are also a collection of document or image marking techniques that have as their primary goal to embed encoded information in an image so that it is substantially imperceptible to a human viewer, in a manner that simultaneously minimizes image distortion caused by embedding the information and permits reliable decoding of the information at a later time in the image life cycle. These techniques, which may be relevant to an embodiment of the present invention, often have design goals that can be generally categorized in terms of three main factors: how much data (i.e., the density) is encoded in the image; how robust the encoded data is to image manipulation such as printing, scanning, rotation, scaling and compression; and how much perceptible change is produced in an original image by adding the encoded data. The intended purpose or function of the encoded data in an image generally determines which one or combination of the three factors is the most important goal of a data encoding technique, and necessarily influences the design and technical details of the technique used. Another factor that is also sometimes taken into consideration when designing an image marking technique is whether the image to which data is to be encoded is a text, or document, image, or a graphic or photographic image.

A particularly well-known area of image marking is known as digital watermarking, which is typically applied to a graphic or photographic image. A successful digital watermarking technique is concerned with the factors of robustness and minimizing image changes, and so is designed to simultaneously produce an embedded signal that is imperceptible to a human viewer so as not to diminish the commercial quality and value of the image being watermarked, while also producing an embedded signal that is resistant to tampering, since removal of the embedded signal defeats the identification purpose of watermarking. A successful watermarking technique is typically designed so that attempts to remove the embedded signal cause degradation of the image sufficient to render it commercially less valuable or worthless. Because the factors of minimizing image change and encoded data robustness are so crucial to successful digital watermarking techniques, the goal of achieving a high data density rate is typically sacrificed in these techniques.

PCT International Application WO 95/14289 discloses a signal encoding technique in which an identification code signal is impressed on a carrier to be identified (such as an electronic data signal or a physical medium) in a manner that permits the identification signal later to be discerned and the carrier thereby identified. The method and apparatus are characterized by robustness despite degradation of the encoded carrier, and by holographic permeation of the identification signal throughout the carrier. The embedding of an imperceptible identification code throughout a source signal is achieved by modulating the source signal with a small noise signal in a coded fashion; bits of a binary identification code are referenced, one at a time, to control modulation of the source signal with the noise signal. In a disclosed preferred embodiment, an N-bit identification word is embedded in an original image by generating N independent random encoding images for each bit of the N-bit identification word, applying a mid-spatial-frequency filter to each independent random encoding image to remove the lower and higher frequencies, and adding all of the filtered random images together that have a "1" in their corresponding bit value of the N-bit identification word; the resulting image is the composite embedded signal. The composite embedded signal is then added to the original image using a formula (Equations 2 and 3) that is based on the square root of the innate brightness value of a pixel. Varying certain empirical parameters in the formula allows for visual experimentation in adding the composite identification signal to the original image to achieve a resulting marked image, which includes the composite identification signal as added noise, that is acceptably close to the original image in an aesthetic sense.

Cox, Kilian, Leighton and Shamoon, in *NEC Research Institute Technical Report* No. 95-10 entitled "Secure Spread Spectrum Watermarking for Multimedia," disclose a frequency domain digital watermarking technique for use in audio, image, video and multimedia data which views the frequency domain of the data (image or sound) signal to be watermarked as a communication channel, and correspondingly, views the watermark as a signal that is transmitted through it. In particular with respect to watermarking an N×N black and white image, the technique first computes the N×N DCT of the image to be watermarked; then a perceptual mask is computed that highlights the perceptually significant regions in the spectrum that can support the watermark without affecting perceptual fidelity. Each coefficient in the frequency domain has a perceptual capacity defined as a quantity of additional information that can be added without any (or with minimal) impact to the perceptual fidelity of the data. The watermark is placed into the n highest magnitude coefficients of the transform matrix excluding the DC component. For most images, these coefficients will be the ones corresponding to the low frequencies. The precise magnitude of the added watermark signal is controlled by one or more scaling parameters that appear to be empirically determined. Cox et. al note that to determine the perceptual capacity of each frequency, one can use models for the appropriate perceptual system or simple experimentation, and that further refinement of the method would identify the perceptually significant components based on an analysis of the image and the human perceptual system. Cox et. al also provide what appears to be a detailed survey of previous work in digital watermarking.

U.S. Pat. No. 5,369,261, entitled "Multi-color Information Encoding System," discloses an exceptionally dense information encoding system that employs colored areas in the forms of bars or checkerboard matrices of colored dot regions to encode information, with each colored region being variable as to both color and intensity. In one embodiment, "super-pixel" dots have differently colored sub-regions within them, arranged with side-by-side colors, or with colored regions stacked one on top of the other, such that information from one dot has as many color variables as there are stacked layers or mixed colors. For each color there are as many as 64 intensities yielding a coding system of high information density. For decoding purposes, the various colors are read out at one super pixel dot position by dividing out reflected or transmitted energy from a dot by color filtering such that a color and intensity can be detected for each color intensity within the super pixel dot. The code provided by this invention is substantially invisible to the naked eye.

Data glyph technology is a category of embedded encoded information that is particularly advantageous for use in image applications that require a high density rate of embedded data and require the embedded data to be robust for decoding purposes. However, data glyph encoding produces perceptible image changes which may be able to be minimized so as to be inconspicuous, or even surreptitious, in particular types of images. Data glyph technology encodes digital information in the form of binary 1's and 0's that are then rendered in the form of distinguishable shaped marks such as very small linear marks. Generally, each small mark represents a digit of binary data; whether the particular digit is a digital 1 or 0 depends on the linear orientation of the particular mark. For example, in one embodiment, marks that are oriented from top left to bottom right may represent a 0, while marks oriented from bottom left to top right may represent a 1. The individual marks are of such a small size relative to the maximum resolution of a black and white printing device so as to produce an overall visual effect to a casual observer of a uniformly gray halftone area when a large number of such marks are printed together in a black and white image on paper; when incorporated in an image border or graphic, this uniformly gray halftone area does not explicitly suggest that embedded data is present in the document. A viewer of the image could perhaps detect by very close scrutiny that the small dots forming the gray halftone area are a series of small marks that together bear binary information. The uniformly gray halftone area may already be an element of the image, or it may be added to the image in the form of a border, a logo, or some other image element suitable to the nature of the document.

Examples of U.S. Patents on data glyph technology are U.S. Pat. Nos. 5,221,833, 5,245,165, and 5,315,098. U.S. Pat. No. 5,221,833, entitled "Methods and Means for Reducing Error Rates in Reading Self-Clocking Glyph Codes", discloses a method for encoding n-bit long multi-bit digital values in a pre-ordered cyclical sequence based on their analytically or empirically determined probabilities of being confused with each other, such that each glyph is adjacent in that sequence to the two glyphs with which it is more likely to be confused during decoding. U.S. Pat. No. 5,245,165, entitled "Self-Clocking Glyph Code for Encoding Dual Bit Digital Values Robustly", discloses a method for encoding dual bit digital values in the cardinal rotations (0°, 90°, 180° and 270°) of a logically ordered sequence of wedge-shaped glyphs (essentially right triangles) that are written, printed or otherwise recorded on a hardcopy recording medium with a predetermined spatial formatting rule. The widths of the glyphs vary unidirectionally as a function of their height, so they can be decoded reliably, even when they are degraded by scan errors, dropped scan lines and/or random noise patterns. U.S. Pat. No. 5,315,098, entitled "Methods and Means for Embedding Machine Readable Digital Data in Halftone Images," discloses techniques for encoding digital data in the angular orientation of circularly asymmetric halftone dot patterns that are written into the halftone cells of digital halftone images.

Commonly assigned U.S. Pat. No. 5,684,885, entitled "Binary Glyph Codes Based on Color Relationships," (hereafter, the '885 patent") discloses a technique that may be used to encode information in a color image. The technique renders binary digital data on a surface, such as a sheet of paper, by printing a series of color patches on the sheet, with the 1 bits rendered as color patches of a first color and the 0 bits rendered as color patches of the second color. The color patches are arranged in a predetermined order along an axis on the surface. The second color relates to the first color by a fixed relationship in color space. In an illustrated embodiment, the first and second colors are a scalar α distance away from an average color along a vector $\underline{v}_0$ in color space. A relatively large area of intermingled color patches for the first color and the second color will optically combine to appear, from a distance to be a single third color. The color patches can be intermixed with areas of a third color, the third color representing an average in color space of the first color and the second color. When these color patches of two different colors are imperceptible to a human, the information they represent becomes invisibly encoded in the image. In the illustrated embodiments in the '521 application, it is noted that, in the choice of orientation of the vector $\underline{v}_0$ and the extent of the scalar α that are used to determine the two colors that are used to produce the color patches, it is desirable to balance the accuracy and sensitivity of the marking device (e.g., a printer) and the digital image capture device (e.g., a scanner) being used with the sensitivity of the human eye. It is desirable to have the deviation between the two colors to be maximally detectable by a scanner and minimally detectable by the human eye. When an average color of the two colors is rendered on the page and is visible to the human eye, the average color should be deemed merely the carrier of information, and the color deviations of neighboring color patches being a modulation of the carrier.

The '885 patent further proposes, at col. 5, that the information encoding technique therein be used in conjunction with the data glyph technology described above. Each individual color patch could be printed in the form of a geometric data glyph in which the shape or linear orientation of each glyph determines whether it is assigned a 1 or 0 value, and the different shading of each glyph, representing one of two different colors, determines whether the color is assigned a 1 or 0 value. The relative colors of neighboring glyphs are independent of the orientations of neighboring glyphs, and so the geometry-based glyphs can be used to render one set of data, while the relative colors of neighboring glyphs render another set of digital data.

Some types of 2D bar code technology encode data at a high density rate but none are intended to produce encoded data that is substantially imperceptible in an encoded image. Data glyph technology, which also supports a high data density encoding rate, is also not designed to produce encoded data that is substantially imperceptible in an encoded image, although data glyphs may happen to be very unobtrusive in an encoded image as a result of where they are placed. The technology disclosed in the '885 patent requires that the differently colored patches produce an average color that effectively hides them from view; in order to decode the message value in a color patch of a first color, it is necessary to determine the second color used to encode a different data value, and also to determine the average color of the image region in which data is encoded in order to establish the color space relationship between the two colors.

SUMMARY OF THE INVENTION

The image encoding technique of the present invention is motivated by the need to reliably encode information at a high density rate in an image, and in particular in graphic or photographic images, without any perceived image degradation or distortion. The technique has as its premise that existing color regions in an original color image may successfully function as the carrier of encoded information in the form of color differences, or color modulations, when the color modulations are rigorously designed to ensure reliable decoding and recovery of the embedded information. The invention makes use of a plurality of data structures, referred to herein as "signal blocks", each having a spatial pattern of color modulation unique to all other signal blocks and that encodes one of the possible values of a coding scheme that the information may assume. When a color value is added to a signal block, an "output signal block color image," or just "output signal block," is produced by modulating, or varying, a reference color defined by a vector in a multi-dimensional color space by a certain magnitude along a color space direction (vector). The color space direction may be selected to ensure that the individual colors within an output signal block are not perceptible to a human viewer of the image and that the output signal block itself has an overall perceived average color of the reference color. When an existing color in an input region of the original color image is provided as the reference color, the color space direction is determined, and a color modulated output signal block is produced to replace the input region in the original image. The specific pattern of the color modulations of a signal block is determined by a vector-valued function that controls the spatial location, and therefore the pattern, of the modulated colors within the output signal block itself. In the illustrated embodiment, defining orthonormal basis functions allows for specifying uniquely patterned signal blocks. Each uniquely patterned signal block is assigned one of the valid values in the coding scheme of the data to be encoded. In one implementation, a long sequence of output signal blocks that encode a message replaces image regions according to some predetermined image order such as, for example, from the top left of an image to the bottom right of an image along a horizontal axis, thus forming a grid of output signal blocks over the image.

Various techniques may be used to determine the colors that are used as the color modulations of a given input color. When the goal of encoding is to produce encoded data that is substantially imperceptible to a human viewer, a suitable technique must be able to identify colors that, when viewed together by a human viewer, average to the given input color and simultaneously are detectable by a digital image capture device such as a scanner for decoding purposes. In one embodiment, the color modulations are determined to be of a predetermined magnitude equidistant from a reference color along a single vector representing a fixed, or constant, direction in a multi-dimensional color space. Each input color from the original image is modulated in this fixed color space direction by the predetermined amount of color change.

In another implementation, the color space direction and the magnitude of the color changes within the patterned output signal blocks may be computed using the technique disclosed in U.S. patent application Ser. No. 08/956,326, entitled "Determining An Optimal Color Space Direction For Selecting Color Modulations" (hereafter, the '326 patent application.) The invention of the '326 application mathematically models the determination of a color space direction as an optimization problem and uses models of human perception and scanner response that produce quantitative measurements of color changes. A given input color and a direction, or vector, in color space define a second color positioned along the vector. A quantitative color difference between the input color and the second color is measured both by the human perception model and the scanner response model. When the measurable color difference is simultaneously minimally perceptible to a human viewer and maximally detectable by a digital image capture device such as a scanner, the vector defined by the input color and the second color is defined to be the optimal color space direction for the respective input color. The technique in the '326 application is premised on the observation that the color modulation could be derived using any one of a number of color space directions centered at the input color but that there is an optimal color space direction that satisfies the perception and detection criteria.

One advantage of using a spatial pattern of color modulations to encode the information is the ease with which the pattern concept can be implemented in both one- and two-dimensions in a signal block. That is, the pattern of color modulations can vary in only one dimension so that the non-varying dimension (e.g., the width or height) of the signal block can be of an arbitrary size. This is useful when it is desirable to reduce the complexity and increase the reliability of decoding the embedded signal in an encoded image. A one-dimensional pattern is simpler to locate without complex image clocking procedures and allows for a larger signal block that increases the signal-to-noise ratio of the signal block for decoding purposes.

When the pattern of color modulations varies in two dimensions, decoding is more complex but two-dimensional signal block encoding can achieve a highly encoded data density rate. In effect, the output signal blocks blanket the image in a two-dimensional grid and can be made as small as is appropriate within the constraints of the decoding process and the marking technology used to produce an encoded image on a marking medium. The two-dimensional grid embodiment of the technique for embedding data is particularly effective in graphic and photographic images for achieving a high information encoding density rate with little or no perceived image degradation.

Another advantage of the encoding technique is that each signal block is a self-contained carrier of its message value, and encodes a message value independently of message values encoded in other signal blocks. Because a message value is encoded by a pattern of color-modulation, and not by color modulation alone, it is not necessary during decoding to determine an additional third color to determine the message value encoded in a received signal block.

Moreover, the basic premise of the pattern-based encoding technique is easily expandable. In one implementation, basis functions define two uniquely patterned signal blocks that vary the color modulation in a single positive color space direction from a reference color. The two signal blocks encode data in a binary (two-valued) coding scheme, for example, having values zero and one. In another implementation, as many as sixteen uniquely patterned signal blocks may be produced by defining basis functions that vary the color modulation in two orthogonal color space directions. Sixteen uniquely-patterned color modulated signal blocks in effect may encode four binary digits in a single output signal block.

The encoding method may also function as a method for facilitating copy detection. That is, output signal blocks may be designed such that an original printed encoded color image will carry the embedded data as evidence of its originality or authenticity. Color copying devices in existence today will be incapable of accurately reproducing the color-modulated signal blocks, and copies of the original encoded image will fail to include all or part of the encoded data. This is accomplished by increasing the spatial frequency of the color modulations within a signal block, thereby making the color-modulated regions within each output signal block small, and by choosing a color space direction that generates modulated colors that are too subtle for current marking technologies to reproduce. On the other hand, signal blocks may be designed to facilitate color reproduction as well, if they are of sufficient size, have a modulation pattern of low spatial frequency, and use a color space direction that generates large color changes capable of reproduction by current color marking technologies.

While the encoding technique is described herein mainly in the context of producing an encoded image version of an original image in which the encoded data is substantially imperceptible, the encoding technique is not so restricted. The encoding technique may produce an output encoded image that simply has a linear sequence or 2D arrangement of output signal blocks that appear to a viewer to be a single- or multi-color image. This type of image may be used, for example, as a label to attach to a product or article. Or the encoding technique may produce an output encoded image of output signal blocks that form a small, but visible portion of another image, such as a colored stripe added to the top or bottom of an image.

Therefore, in accordance with one aspect of the present invention, a method is provided for operating a processor-controlled machine to produce an output color image having at least one message data item indicating data encoded therein. The machine includes a processor and a memory device for storing data including instruction data the processor executes to operate the machine. The processor is connected to the memory device for accessing and executing the instruction data stored therein. The method comprises obtaining a message data item indicating a message value that is one of an expected set of valid message values in a predetermined coding scheme, and selecting a modulation pattern data structure representing the message value. The selected modulation pattern data structure is one of a plurality of modulation pattern data structures each uniquely representing one of the valid message values in the coding scheme. Each modulation pattern data structure defines dimensions of an output signal block color image and includes a plurality of at least two different data values spatially arranged in a pattern indicating image locations in the output signal block color image of at least two colors; the two colors are produced by applying a color difference quantity to an unspecified reference color. The method further comprises obtaining an output color value as the unspecified reference color and obtaining the color difference quantity using the output color value. Then an output signal block color image is produced using the output color value, the color difference quantity and the selected modulation pattern data structure. The output signal block color image has the dimensions indicated by the modulation pattern data structure and includes a spatially arranged pattern of color modulated image regions having color values produced by modulating the output color value by the color difference quantity, subject to the requirement that the output color value be an average color of all of the color values of the color modulated image regions. An output color image is produced that includes the output signal block color image as an image region therein.

In another aspect of the invention, obtaining the color difference quantity includes using the output color value to compute, in a multi-dimensional color space, a color space direction and associated color modulation magnitude that together define an additive change in the output color value, and modulating the output color value by the color difference quantity includes generating the color values of the spatially arranged pattern of color modulated image regions by varying the output color value by the additive change scaled by scaling data included in the modulation pattern data structure.

In still another aspect of the invention, the color difference quantity is a color space direction and associated color modulation magnitude that is computed so that the color values of the color modulated image regions included in the output signal block color image are simultaneously capable of being detected by a digital image capture device and are visually substantially imperceptible to a human viewer of the output signal block color image. The spatially arranged pattern of color modulated image regions in the output signal block color image are thereby visually substantially imperceptible to the human viewer.

In accordance with yet another aspect of the present invention, a method is provided for operating a processor-controlled machine to encode a plurality of message data items in an encoded color image version of an input color image so that the message data items are visually substantially imperceptible to a human viewer. The machine includes a processor and a memory device for storing data including instruction data the processor executes to operate the machine. The processor is connected to the memory device for accessing and executing the instruction data stored therein. The method comprises receiving an input color image data structure including a plurality of subregions and obtaining a plurality of ordered message data items having a predetermined order, each indicating a message value that is one of an expected set of valid message values in a predetermined coding scheme. The method further includes, for each ordered message data item, in the predetermined order thereof, producing an output signal block color image, including selecting a signal block data structure representing the message value of the message data item. A selected signal block data structure is one of a plurality of signal block data structures each uniquely representing one of the valid message values in the coding scheme. Each signal block data structure defines size dimensions of an output signal block color image and includes variable data indicating a color difference quantity. Each signal block data structure further includes scaling data indicating a spatially arranged modulation pattern specifying image locations in the output signal block color image of scaled color difference quantities produced by applying the scaling data to the color difference quantity. Producing an output signal block color image further includes determining an input color value of one of the subimage regions of the input color image, obtaining the color difference quantity using the input color value, and producing an output signal block color image using the input color value, the color difference quantity and the selected signal block data structure. The output signal block color image has a spatially arranged pattern of color modulated image regions each having a color value produced by modulating the input color value by the color difference quantity according to the scaling data indicating the modulation pattern, subject to a requirement that the input color value be an average color of all of the color values of the color modulated image regions. Then the subimage region in the input color image is replaced with the output signal block color image. The encoded color image version of the input color image is produced by replacing the subimage regions of the input color image with the output signal block color images in the predetermined order of the ordered message data items, and is perceived by a human viewer to be substantially identical in appearance to the original color image.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

BRIEF DESCRIPTION OF THE DRAWINGS

FIG. 35 graphically illustrates a set of four vector-valued basis functions as basis blocks that implement color modulations in two color space directions (represented as $\underline{\delta}$ and $\underline{\mu}$) that may be used to construct unique signal blocks suitable for use in encoding messages using the technique of the present invention;

FIG. 36 illustrates the sixteen (16) unique signal vectors that may be defined using the four basis functions of FIG. 35 to construct sixteen unique signal blocks suitable for use in encoding messages using the technique of the present invention;

FIGS. 37 and 38 schematically illustrate how two of the sixteen signal blocks of FIG. 36 are constructed from the basis functions illustrated in FIG. 35;

FIG. 39 illustrates the sixteen unique signal blocks that are constructed from the basis functions illustrated in FIG. 35;

DETAILED DESCRIPTION OF THE INVENTION

As a preliminary matter, in the mathematical portions of the description below, the following mathematical notation is used. A vector of scalars, such as a color and such as a signal vector described below, is represented as an underlined bold lower case letter. A lower case italic letter with an arrow above it denotes a 2×2 arrangement of three-dimensional vectors, such as is used in the definition of a signal block. A scalar is represented as an italic lower case letter. A matrix is represented as a bold capital letter. The transpose of a matrix is represented with a small italic superscript t.

Figure 1:
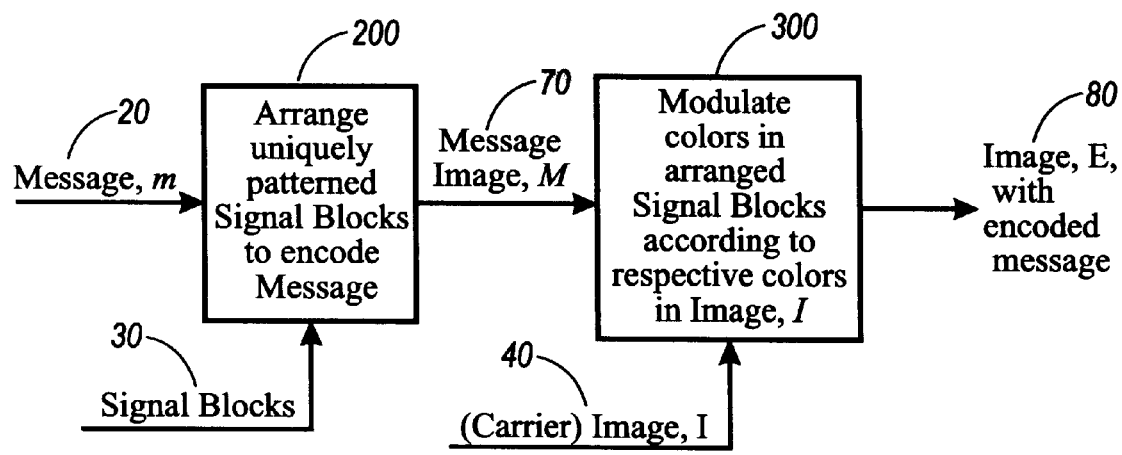
FIG. 1 is a block diagram schematically illustrating the input and output data structures and the processes of the color image encoding technique of the present invention.

FIG. 1 is a block diagram of the image encoding technique showing operations 200 and 300 and illustrating the input and output data structures that the two operations require. These operations and data structures are briefly introduced here and discussed in more detail below. Operation 200 produces a message image 70, M, from input data 20 denoted in FIG. 1 as message, m, that is to be encoded in an original color image 40. Message, m, includes message values that are instances of valid message values in a coding scheme, such as a binary coding scheme. Operation 200 uses data structures 30, referred to hereafter as "signal blocks", that are specifically designed to encode message m. There is a uniquely patterned signal block for every valid value in the coding scheme. Operation 200 defines the uniquely-patterned signal blocks 30 used for encoding and arranges them according to the message, m, forming a collection of signal blocks that is referred to as message image 70. Each signal block 30 defines the size dimensions of an output signal block color image produced as a result of the encoding operation, and includes variable data indicating a color difference quantity. Each signal block 30 also includes scaling data indicating image locations in the output signal block image of a pattern of constituent image regions, also referred to herein for conciseness as "subregions." The subregions in the output signal block have at least two different color values and occur in a unique image location pattern defined by the signal block. Operation 300 additively combines message image 70 with input color (carrier) image 40, determining the colors of the component subregions of each output signal block using a color difference quantity, the signal blocks arranged in message image 70 and an input color from image 40. Once the colors for each output signal block have been determined, the final encoded image 80, denoted as image, E, is complete.

1. Signal blocks

Figure 2:
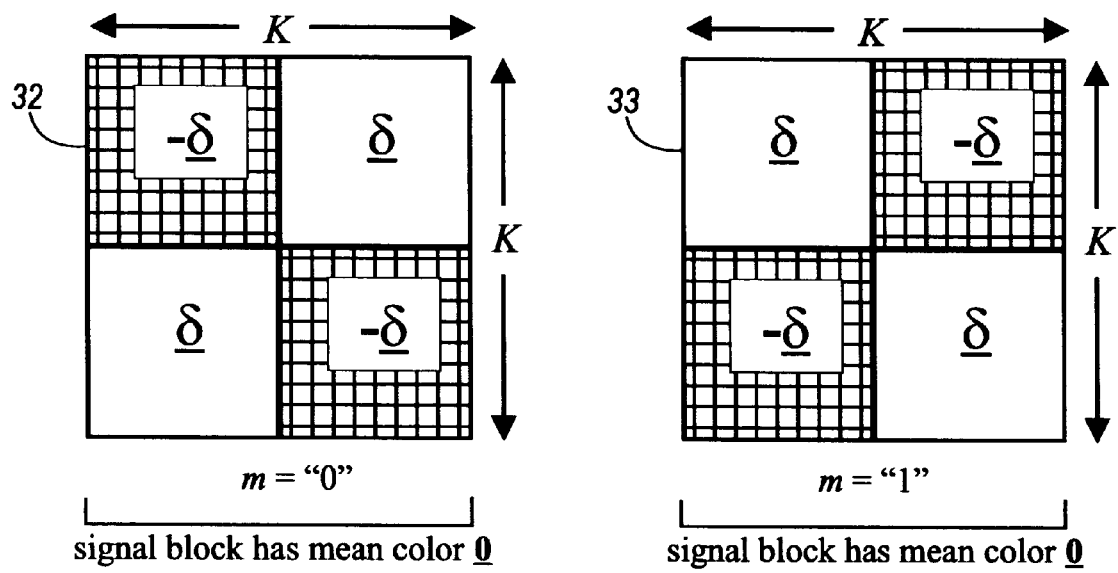
FIG. 2 illustrates a pair of data structures called signal blocks each comprised of smaller subregions arranged in a unique two-dimensional pattern that encodes a unique message value, according to an illustrated embodiment of the present invention.

FIG. 2 illustrates a first embodiment of a pair of signal blocks 32 and 33 that are suitable for use in encoding message, m, when message, m, is represented in the form of data items indicating values "0" and "1" inclusively. Each signal block has dimensions of K×K measured in units called "color cells" (defined below) and, as noted above, includes several smaller regions differentiated by color modulation and arranged in a unique spatial pattern. FIG. 2 shows an example of a pair of signal blocks each having a different spatial pattern of four square subregions of two different color modulations. A "color Modulation" is a color difference quantity, or color change quantity, that is to be applied to an unspecified reference color to produce the output signal block color image. It is to be understood that the patterns illustrated in FIG. 2 are for illustrative purposes only and are not intended to imply that the subregions have any specific or required shape. The unique spatial arrangement, or pattern, of the differently color modulated subregions in the signal block indicates the value of the message data item the signal block encodes. Signal block 32, with subregions arranged as shown, encodes a "0" value, and signal block 33, with subregions arranged in a different unique pattern, encodes a "1" value. The signal blocks illustrated in FIG. 2 include unique patterns of subregions that vary in both the x and y dimensions and so are referred to as two-dimensional (2D) signal blocks.

In FIG. 2, the different color modulations of the subregions are denoted by vector notation $\pm\underline{\delta}$, which signifies that the color modulation, or change, in the color value of each subregion occurs along a vector specifying both a color space direction and associated color modulation magnitude in a multi-dimensional color space. The color modulations have the requirement that the overall mean of the color difference quantities in a signal block is $\underline{0}$. That is, while the individual subregions denote different color modulations, these color differences produce no overall change in color in an output signal block, once the color modulations are applied to a reference color. Thus, an output signal block, which is composed of image regions having color values produced by modulating a reference color according to the color modulation pattern, will appear to have an average color of the reference color; the color modulated image subregions will not be perceptible to a human viewer and will be integrated by the human eye into the mean color of the reference color. How the color space direction and the color modulation of the subregions are selected is described below in the discussion accompanying FIGS. 9 and 10.

Figure 48:
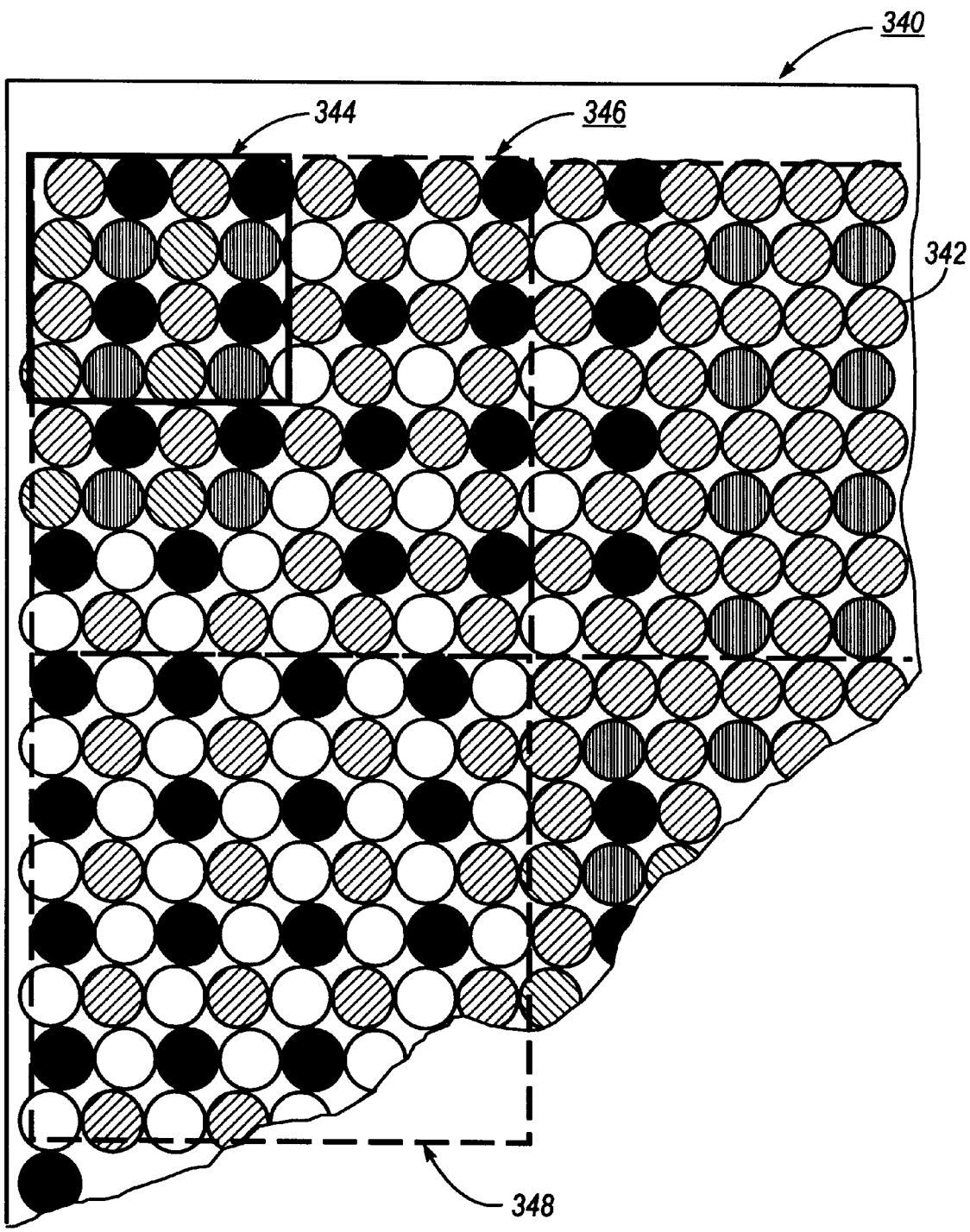
FIG. 48 schematically illustrates an enlarged portion of a printed image graphically showing how the terminology of printer spots, color cells, subregions and signal blocks is used in the context of the present invention.

Before proceeding with the description of the invention, it is useful to provide definitions and clarification of some of the terminology used herein; this terminology is discussed with reference to FIG. 48. It was noted above that a signal block has dimensions of K×K expressed in units called "color cells." In the context of this invention, a "printer cell" is the smallest unit of the absence or presence of a mark on a printed medium. FIG. 48 shows a small, substantially enlarged portion of printed color image 340, with pattern- or solid filled, uniformly sized circles representing printer cells, such as printer cell 342. In a black and white printer a printer cell is approximately a single printer spot.

A "color cell" in the context of the present invention is the smallest color mark or marks on a medium that the human eye can integrate into a full color mark; for the most common marking technologies this is often made up of a small number of printer cells, each printed in a different color such as cyan, magenta, yellow and black. These differently colored printer cells may be, but need not be, of a uniform size. The solid outlined group of printer cells with reference numeral 344 in FIG. 48 denotes an example of a color cell. The precise definition of a color cell is a function of the particular printer technology; it may be, for example, a dot screen, a line screen, or continuous tone. Thus, it is to be understood that color cell 344 in FIG. 48 is only representative of the definition and does not indicate that a color cell is necessarily composed of any particular fixed number of printer cells nor that it is composed of uniformly sized printer cells.

A subregion in an output signal block color image is typically comprised of several color cells, and consequently an output signal block is also composed of several color cells. It is possible, however, that a marking technology could produce a single mark that a human is able to integrate into a full color mark and that is perceptible as such, in which case a subregion could be composed of a single color cell. The design of a signal block (i.e., its size and the pattern of the subregions), then, may depend on or be influenced by the particular printing technology that will be used to render the encoded image. In FIG. 48, a portion of an output signal block produced from a signal block of the type illustrated in FIG. 2 is shown in heavy dotted lines and labeled as reference numeral 346. A signal block subregion is shown as reference numeral 348.

2. General operation of message encoding operation 200

Figure 3:
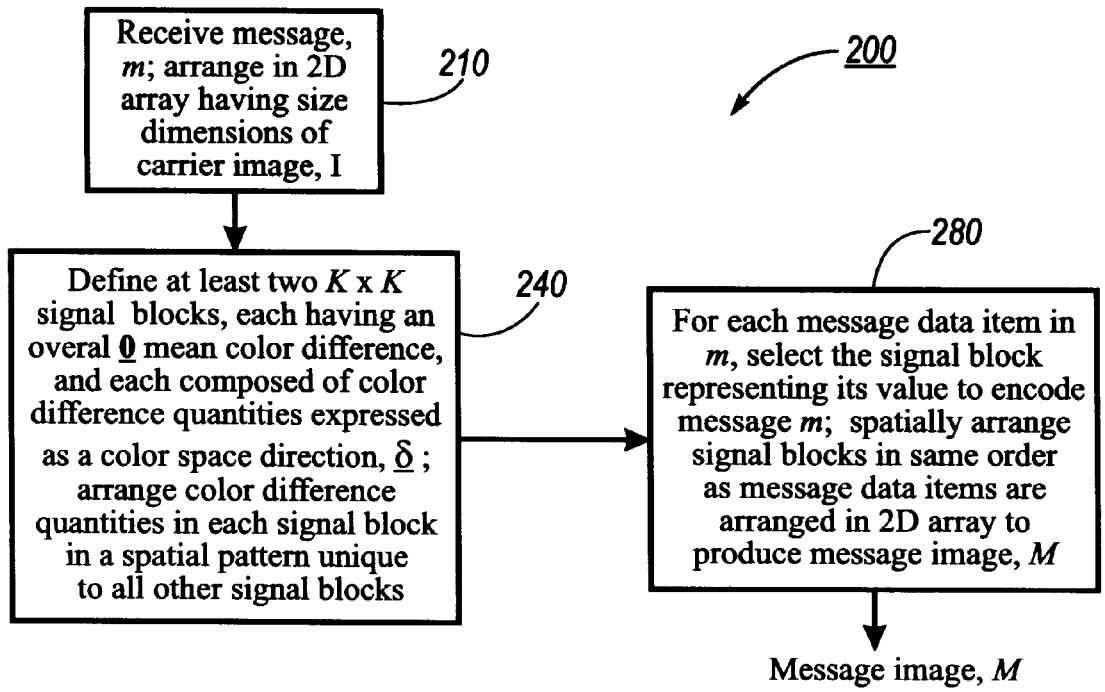
FIG. 3 is a flowchart illustrating the general operation of the message-encoding portion of the technique of the present invention.

The flowchart of FIG. 3 illustrates an embodiment of operation 200 of the image encoding technique. Operation 200 assumes that there is a known color image 40 (FIG. 1), referred to as the carrier image, into which input message data 20, also referred to as message m, is to be encoded. Message data 20 is composed of a string of message data items each indicating one of a set of valid message values in a coding scheme. Message data 20 is not restricted in any way as to the nature of the information it may convey, and may, for example, represent character symbols in a language using ASCII or UNICODE character encoding, or the compressed or encrypted form of such symbols. Message data 20 may also include error correction codes and any other such data as might be needed to facilitate decoding. Message data 20 may indicate binary data in the form of "0" and "1" symbols, or may indicate a set of values that define another coding scheme. Message data 20 may also indicate instruction data of the type used to operate a processor that controls a machine having the configuration of machine 100 in FIG. 47. Examples of such machines include a computer, printer, scanning device or facsimile device, or a machine that combines these functions. By way of further clarification as to terminology, the term "indicates" as used in this description and in the claims has several meanings, which can be determined in a particular instance by the context of its use. An item of data is said to "indicate" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data.

Figure 4:
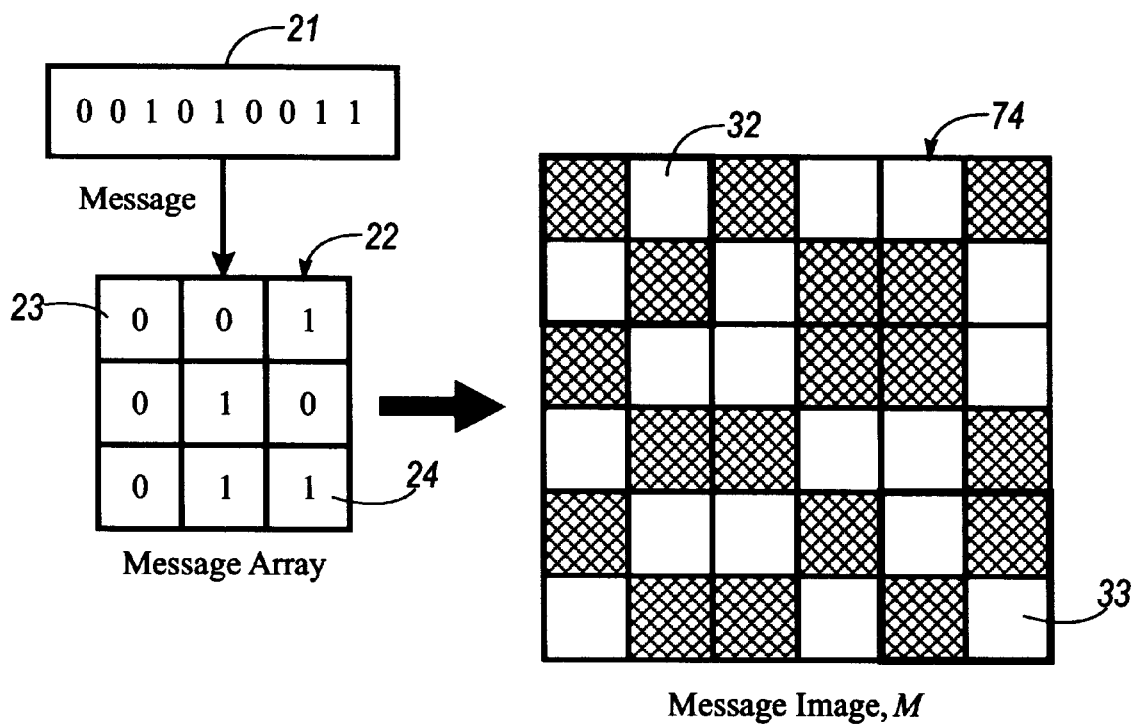
FIG. 4 schematically illustrates the results of the encoding process of FIG. 3 of a sample message encoded using the signal blocks of FIG. 2, according to an illustrated embodiment of the present invention.

Message data 20 is received in box 210. In this illustrated embodiment, the output signal blocks carrying the encoded data are arranged in the encoded image in a two-dimensional array. The message data items of message data 20 are arranged in a two-dimensional (2D) message array having the same size dimensions as carrier image 40. FIG. 4 shows an example of message array 22, where the message "001010011" has been arranged in a 3×3 array, with the message data items starting in the upper left corner of the array and ending in the lower right corner. Message array 22 is an example only; the message data items may be arranged in an array in any predetermined order. Retuning now to FIG. 3, a uniquely-patterned signal block is defined for each permitted message data value in the coding scheme, in box 240, as described above in the discussion accompanying FIG. 2. For each message data item in message array 22, the signal block that represents the value indicated by the message data item is selected, and all selected signal blocks are spatially arranged, in box 280, into an image, called the message image 74, M. Message image 74 in FIG. 4 illustrates the message image formed from spatially arranging the appropriate signal blocks for the data in message array 22. It can be seen, for example, that signal block 32 encodes the "0" value of message data item 23 in message array 22 and signal block 33 encodes the "1" value of message data item 24 in message array 22. At this point, message image 74 and the signal blocks included therein have no colors associated with them.

3. General operation of color modulation operation 300 a. Producing the encoded image

Figure 5:
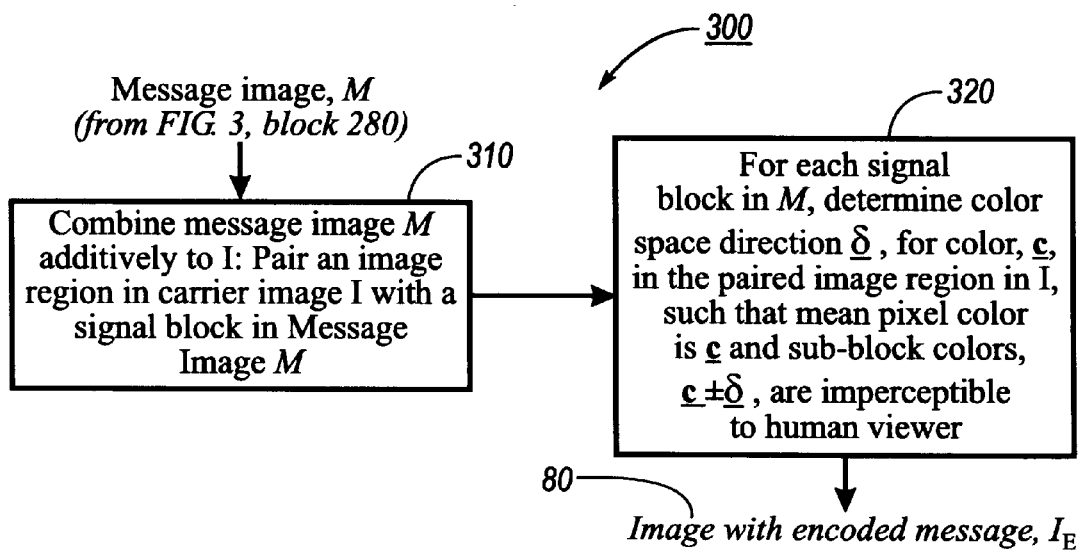
FIG. 5 is a flowchart illustrating the general operation of the image combination and color modulation portion of the technique of the present invention.

Color modulation operation 300 (FIG. 1) is shown in more detail in the flowchart of FIG. 5. In general, a small image region in the original color (carrier) image is paired with each signal block in message image 74 (FIG. 4). The color of that image region, referred to as the reference or target color of the signal block, is the color that is modulated according to the spatial subregion pattern of color difference quantities of the respectively paired signal block to produce an output signal block in the encoded image.

When the paired image region in the original image is sufficiently smooth in color, a signal block may be directly encoded there. When the image region is not sufficiently smooth in color, such as for example where an edge between two distinctly different colored regions occurs, it will be difficult to make the determination as to what the average, or target, color of the region is. Since the target color is modulated to produce the signal block that is finally encoded in the image and the goal of this embodiment is to produce a signal block that is imperceptible to a human viewer, the target color used for modulation should be as accurate a representation of the average color for the image region as is possible.

Figure 6:
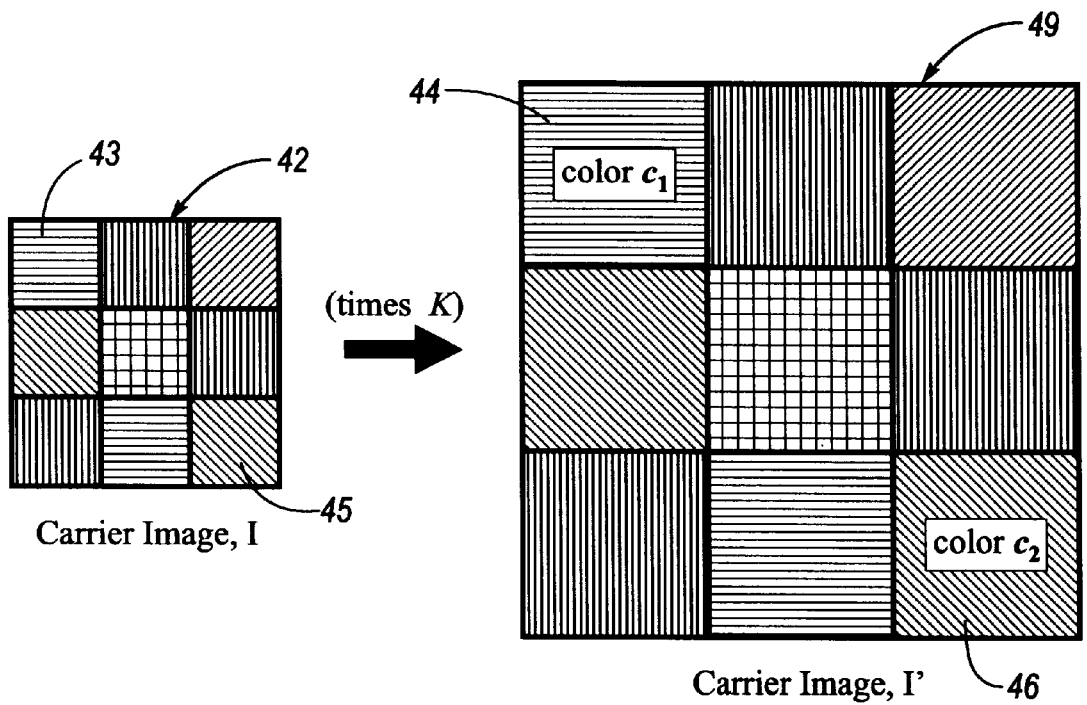
FIG. 6 schematically illustrates results of segmenting and optional upsampling operations that are performed on an intermediate image according to an illustrated embodiment of the present invention.

One solution to images containing substantial image color variation is to upsample the image by K to ensure that every location that is to have a signal block is a smooth color. Upsampling, however, is not a requirement or limitation of the encoding invention. Since each signal block in message array 74 has dimensions K×K color cells, the carrier image into which a message is to be encoded may be first enlarged, or upsampled, in box 310 so that each pixel in the carrier image becomes a small image region the size of a signal block. This upsampled image is referred to as carrier image I'. This process is illustrated in FIG. 6. Original color image 42 is a representative color image shown with pixels of various colors represented by different cross-hatching patterns. Original color image 42 is shown schematically as having a simple composition for purposes of illustration so that the color image encoding technique can be clearly illustrated. It is understood that a color image of any type of pictorial complexity may be suitable for encoding according to this technique. After upsampling operation 310, carrier image 49 is shown in FIG. 6 with enlarged image regions of the same colors. Image regions 44 and 46 in image 49, which correspond to pixels 43 and 45 in image 42, are specifically called out as having different colors, denoted as $\underline{c}_1$ and $\underline{c}_2$.

Returning to the flowchart of FIG. 5, message image 74 (FIG. 4) is then additively combined, in box 320, with upsampled carrier image 49 to produce the encoded image. During this combining process, color modulation in each signal block occurs. That is, for each signal block in message image 74, box 320 determines color space directions $\pm\underline{\delta}$ relative to the color, $\underline{c}$ of the paired image region in carrier image I', and the subregions of the output signal block are given colors $\underline{c}\pm\underline{\delta}$. Colors $\underline{c}\pm\underline{\delta}$ are selected so as to be imperceptible to a human viewer, detectable by a digital image capture device such as a scanner, and have an average perceptible color of $\underline{c}$.

Figure 7:
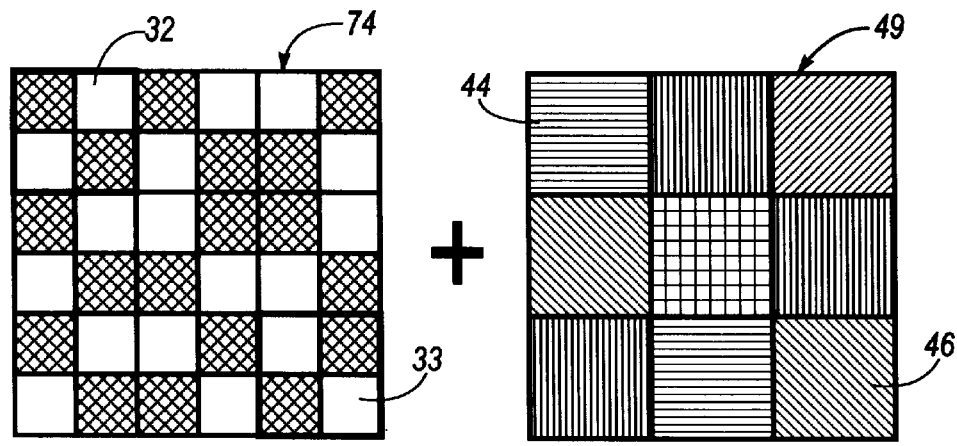
FIG. 7 schematically illustrates the combining of the message image of FIG. 4 with the carrier image of FIG. 6 as part of the color modulation operation of FIG. 5 to produce an encoded image according to an illustrated embodiment of the present invention.
Figure 8:
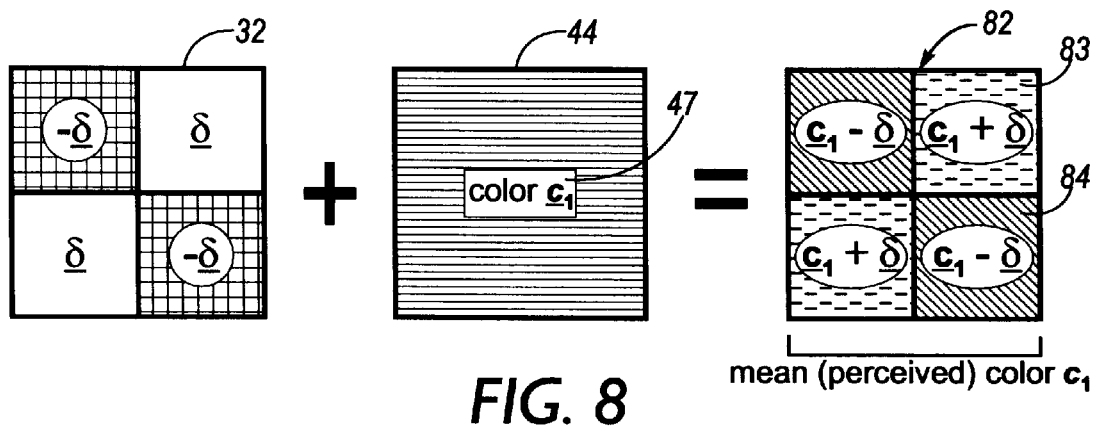
FIGS. 8 and 9 schematically illustrate the color modulation process of representative ones of the signal blocks of FIG. 2 when they are combined with respective ones of the image portions of the carrier image of FIG. 6 according to an illustrated embodiment of the present invention.
Figure 9:
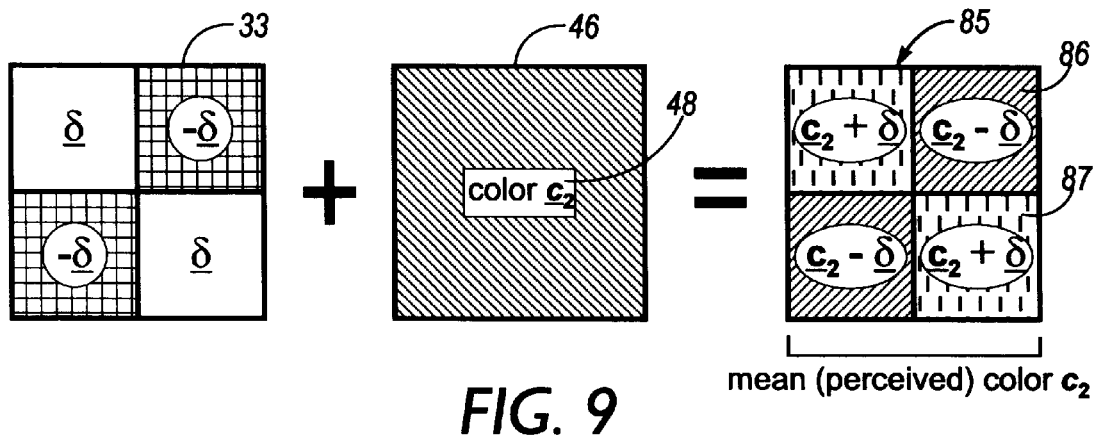

FIG. 7 schematically illustrates the additive combining process of carrier image 49 and message array 74 carried out by box 320 of operation 300. FIG. 8 illustrates the combining process of a representative one of the signal blocks of message image 74 with its paired carrier image region. Signal block 32 is combined with carrier image region 44 having color $\underline{c}_1$. Resulting output signal block 82 has subregions of colors $\underline{c}_1+\underline{\delta}$ and $\underline{c}_1-\underline{\delta}$ arranged in the spatial pattern of signal block 32, with an overall mean perceived color of $\underline{c}_1$. FIG. 9 illustrates the combining process of a second one of the signal blocks of message image 74 with its paired carrier image region. Signal block 33 is combined with carrier image region 46 having color $\underline{c}_2$. Resulting output signal block 85 has subregions of colors $\underline{c}_2+\underline{\delta}$ and $\underline{c}_2-\underline{\delta}$ arranged in the spatial pattern of signal block 33, with an overall mean perceived color of $\underline{c}_2$.

Figure 10:
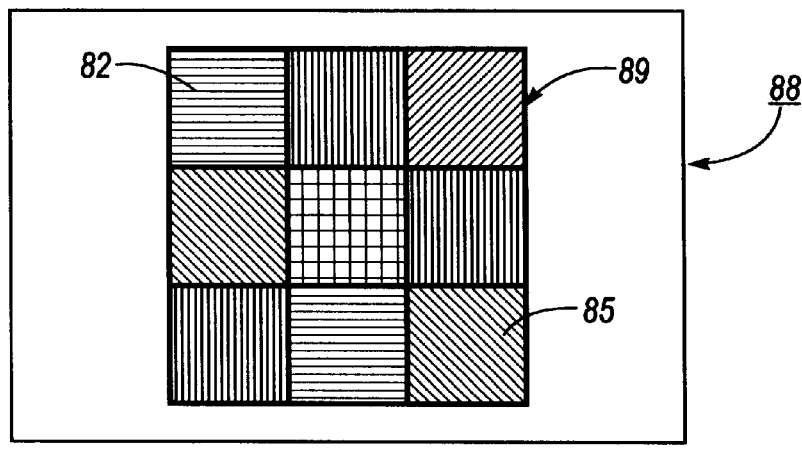
FIG. 10 schematically illustrates an encoded color image that results from the color image encoding technique of the present invention.

FIG. 10 schematically illustrates the final encoded color image 88 showing the two-dimensional array 89 of output signal block color images. Encoded image 88 includes color-modulated output signal blocks 82 and 85 of FIGS. 8 and 9 respectively. Because message data 20 has been imperceptibly encoded via the color modulated signal blocks in carrier image 49 of FIG. 6, the colors of encoded image 88 are represented as being the same as those of carrier image 49, with various cross-hatching patterns. When a large message is densely encoded into a color image, the 2D signal blocks that encode the message form a grid that is superimposed over the original color image when the message image is additively combined in box 320 of FIG. 5.

b. Determining the color modulations of the signal blocks

As already noted above, the colors of the subregions in each signal block are modulations of the color of the pixels in the original, or carrier, image. Specifically, the modulation is a small additive shift, $\pm\underline{\delta}$, in the color $\underline{c}$ of a set of pixels in a region of the original image. In an actual implementation of the encoding technique, the unit direction $\underline{\hat{\delta}}$ vector and magnitude $\delta$ of the modulation $\underline{\delta}=\delta\underline{\hat{\delta}}\epsilon\Re$, where $\Re$ indicates the set of real numbers, were fixed as constants. The unit color space direction $\underline{\hat{\delta}}$ was selected to be in the yellow-blue direction. Modulations in the yellow ($+\underline{\delta}$) and blue ($-\underline{\delta}$) directions added to each of the input colors were shown to have little or no unacceptable image degradation on the final encoded image.

Alternatively, rather than fixing the unit direction $\underline{\hat{\delta}}$ vector and magnitude $\delta$ of the modulation $\underline{\delta}$ as constants, they may be optimally chosen according to a technique disclosed in copending U.S. patent application Ser. No. 08/956,326 (referenced earlier as the '326 application) for determining an optimal color space direction for a respective input color. The technique disclosed therein mathematically models the search for the color space direction as an optimization problem and uses models of human perception and scanner response that produce quantitative measurements of color changes. A given input color $\underline{c}$ and a second color positioned in a color space define a vector, or direction, in the color space. A quantitative color difference between color $\underline{c}$ and the second color is measured both by the human perception model and the scanner response model. When the measurable color difference is simultaneously minimally perceptible to a human viewer and maximally detectable by a digital image capture device such as a scanner, the vector defined by color $\underline{c}$ and the second color is defined to be the optimal color space direction for the respective input color $\underline{c}$.

Figure 11:
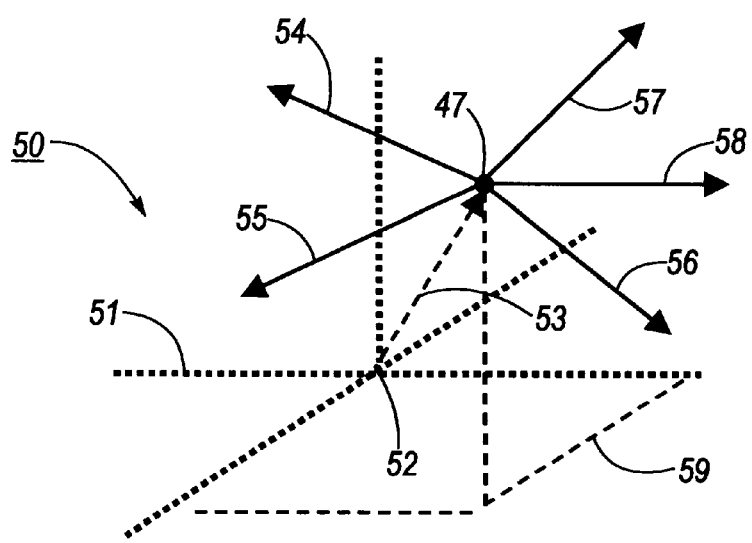
FIGS. 11 and 12 schematically represent a multi-dimensional color space in which a unique color space direction among several possible color space directions may be determined for producing appropriate color modulations of a target, or reference, color in an output signal block, according to one embodiment of the present invention.
Figure 12:
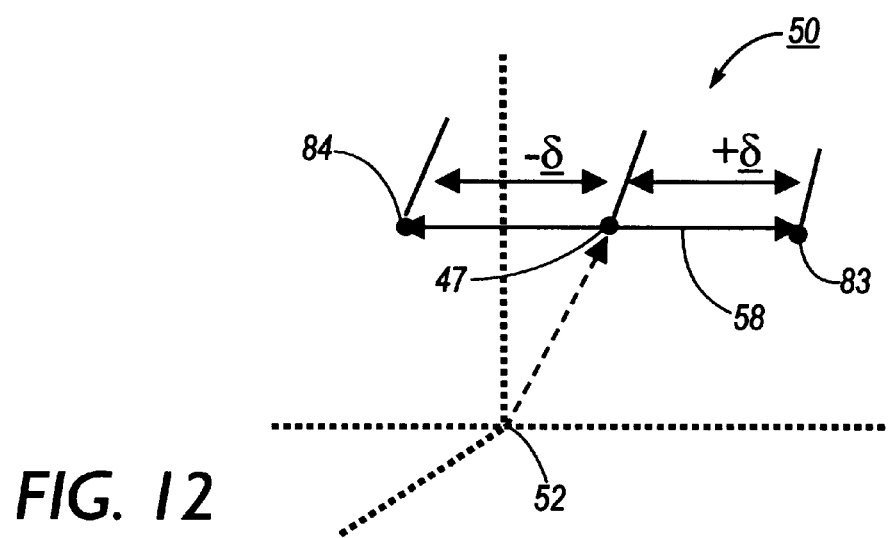

Three-dimensional arbitrary color space 50 in FIG. 11 is defined by bold dotted line axes 51 and has its origin at point 52. Input color 47 is positioned in color space 50 as shown; dashed line vector 53 from color space origin 52 and dashed lines 59 simply provide clarification as to the location of input color 47 in the perspective diagram of FIG. 11. Colors that differ from color 47 in color space 50 could be positioned along any one of a number of vectors 54, 55, 56, 57, and 58. The task is to find a color space direction from which a color may be selected that has a measurable color difference that satisfies the problem constraints: a vector in color space formed by color $\underline{c}$ and a second color is an optimal color space direction $\underline{\delta}$ when the second color is selected so that the color difference between color $\underline{c}$ and the second color simultaneously minimizes color response by a human viewer and maximizes color response by a scanner. FIG. 12 also shows color space 50 but with only color space vector 58. Colors 83 and 84 are also shown positioned in color space 50, along vector 58. Color space direction 58 is the optimal color space direction when the measured, quantitative color difference between colors 47 and 83 simultaneously minimizes color response by a human viewer and maximizes color response by a scanner.

Note that the encoding technique may also encode data into gray scale images. In the gray scale implementation, all input colors are included in a set of gray scale colors that ranges from black to gray to white; that is, a color has equal R, G and B components. The color space direction is then known as the direction in color space that indicates the set of gray scale colors. The color values of the color modulated image regions included in the output signal block color image are therefore all included in the set of gray scale colors.

c. One-dimensional signal blocks

When a high encoded data density rate is not required in the encoding application, a one-dimensional (1D) signal block may be used for encoding. In a 1D signal block, the unique color-modulated pattern varies in only one dimension linearly across the entire image such that there is essentially only one row or column of message in the encoded image. Such encoding might permit a simple, hand held digital image capture device to digitize and decode the encoded image without the need to be concerned about image alignment and skewing issues, and without the need for finding the locations of encoded signal blocks in a 2D grid.

Figure 13:
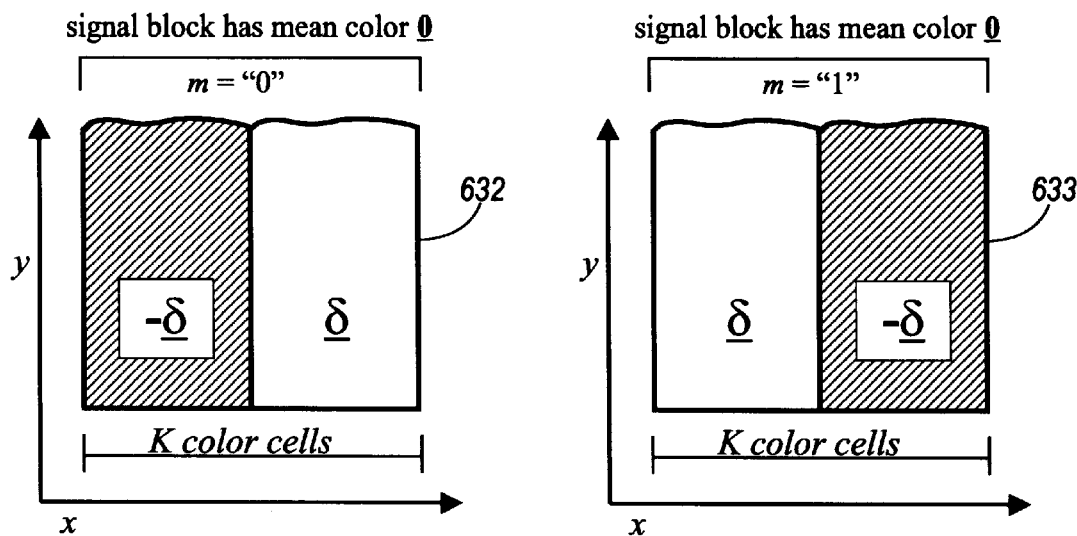
FIG. 13 schematically illustrates an example of another pair of signal blocks, each comprised of a unique one-dimensional pattern of different color modulations, also suitable for encoding a message according to the technique of the present invention.
Figure 14:
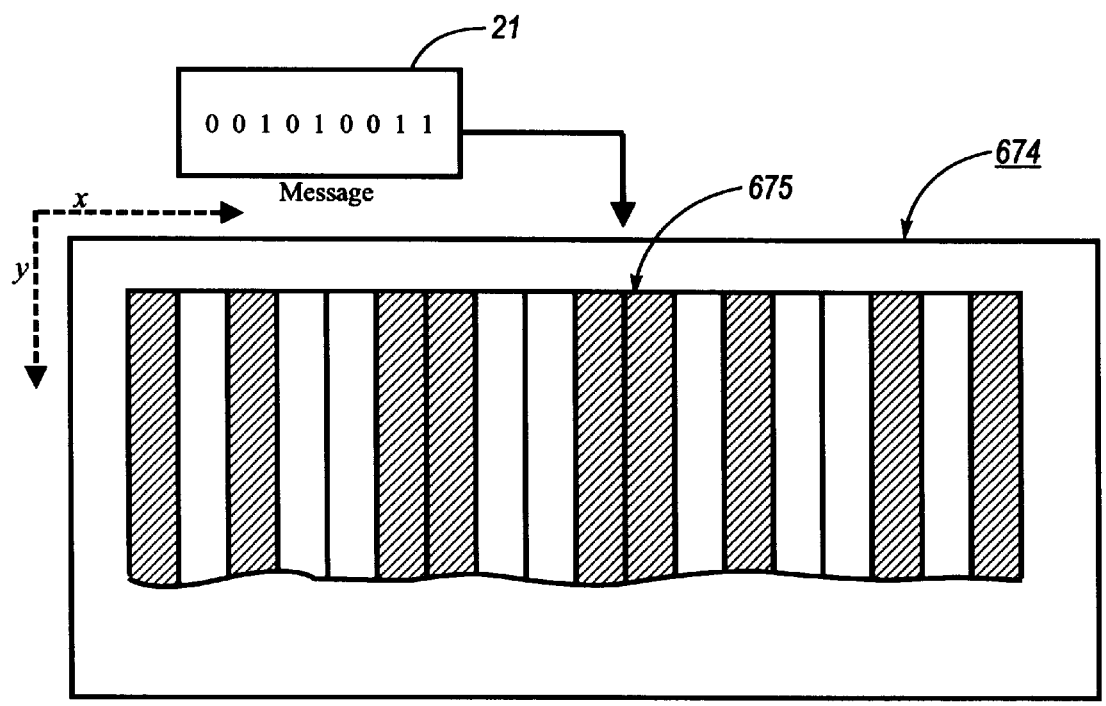
FIG. 14 schematically illustrates the encoding of message data items into a message image using the one-dimensional signal blocks of FIG. 13.

FIG. 13 illustrates a pair of 1D signal blocks 632 and 633 that encode data items having the possible values of "0" and "1". Signal blocks 632 and 633 define an output signal block to have a dimension of K color cells in the x direction and may be of any arbitrary size in the y direction. Each signal block has a pattern of color modulations that is distinct and unique from the other, as required by the definition of a signal block. FIG. 14 illustrates an output image 674 having message 21 encoded into a linear sequence of signal blocks 632 and 633 to form message image 675. (Message image 675 is comprised of the signal blocks before a color value has been applied, or added, to them, so that the encoding of the message values can be illustrated by the cross-hatching patterns.) The bottom edge of message image 675 is shown as being incomplete to indicate that the y height dimension of message image 675 may be of any arbitrary height.

Encoding of 1D signal block into a color image parallels the methodology for 2D signal block encoding. Unless the color image has large, essentially rectangular regions of a single color, a 1D signal block having a fixed height in one dimension in which no signal is carried is still likely to be embedded over a varying range of colors in that dimension. Thus, if it is the y image dimension of the signal block that is fixed, the actual target color about which the subregion colors modulate is changing all along the y dimension of the signal block. Two techniques ensure that 1D signal blocks are not perceptible in the final encoded image. First, upsampling the carrier image in both directions as is done for encoding 2D signal blocks will ensure larger, smoothly varying local color regions. Second, one could think of encoding a 1D signal block as being done in two dimensions while the signal (message value) is only carried in one dimension. A complete 1D signal block is embedded in the carrier image by processing a fixed portion along the y-dimension at a time, and changing the color modulation for the portion according to the input image target color at that point. This is done for the total y-dimension of the signal block to make sure it is not visible.

d. Variations of the illustrated embodiment

The illustrated embodiment of encoding just described assumes that the goal of encoding is to produce an encoded image version of an original color image having the data encoded therein in a substantially imperceptible manner, causing little or no image distortion to the original image. The data may be encoded over an entire color image, or in just a portion thereof, or it may be added to an original image such as a document by, for example, adding a colored band of encoded data to the top or bottom or along a side of the document.

The encoding technique may be used in a wide variety of other implementations as well. For example, rather than encode data into an existing original image, a particular implementation may produce, or generate, an encoded image that is comprised of only encoded output signal blocks. Such an image may be used as an identifying image, such as a label, to be attached to an article or product. In this case, an input color value may not necessarily be obtained from another image, but may simply be input as a color value. The input color value may also be a constant color value, producing a solid blue or red or orange image, for example, or a multi-colored encoded image having an abstract composition.

There may be applications when it is not necessary to hide the color modulations within each output signal block so that the requirements discussed above for computing a color space direction subject to the constraints of maximizing scanner detection and minimizing human perception may not be necessary. Any other suitable method may be used for determining color difference quantities to be applied to a reference color to produce color modulated image regions in the output signal block color image, subject to a requirement that the colors of the color modulated image regions all average to the reference color.

In the illustrated embodiment, a single color space direction is used for the color difference quantities for every location within an output signal block. The discussion below describes an implementation that allows for defining a substantial number of unique signal block patterns by allowing for two orthogonal color space directions. However, when it is not necessary to hide the color modulations within each output signal block, the color space direction may be a function of an image location in the output signal block, and so multiple color space directions may be used and they may be allowed to vary across the signal block.

4. Mathematical representation of signal blocks

The theoretical basis and mathematical model of the encoding technique follows classical communications theory, specifically the classical vector-channel formulation as developed in many texts on the subject. Readers are directed to the text by Wozencraft and Jacobs, *Principles of Communication Engineering,* John Wiley & Sons, 1965, Chapter 4, "Optimum Receiver Principles," for further information. In this adaptation, each message data item m, is encoded as a discrete spatial signal block $\vec{s}_i[p,q]$ and transmitted through the channel. A signal block $\vec{s}_i[p,q]$ is a 2D arrangement of three-dimensional (3D) vectors, each of which specifies a color (or more specifically, a color difference quantity) in a 3D color space. A signal block defines the dimensions of an output signal block as being a K×K color image. The set of M possible unique signal blocks $\{\vec{s}_0, \vec{s}_1, \ldots, \vec{s}_{M-1}\}$ is called a "signal set," where M indicates the number of distinct values in the coding scheme.

A signal block is constructed as a linear combination of a set of N orthogonal basis functions $\vec{\phi}_j[m,n]$ that are also 2D, discrete vector-valued functions. Signal blocks are linear, weighted sums of the basis functions. Each basis function, also referred to as a basis vector, determines a scaling factor that scales the magnitude of the color difference from a reference color along a color space direction in a multi-dimensional color space. The basis vectors defining signal blocks 32 and 33 in FIG. 2 can be expressed formally as follows:

$$\vec{\varphi}_0 = \frac{\sqrt{2}}{K} \begin{bmatrix} \underline{0}^t & \underline{0}^t & \ldots & \underline{\hat{\delta}}^t & \underline{\hat{\delta}}^t & \ldots \\ \underline{0}^t & \underline{0}^t & \ldots & \underline{\hat{\delta}}^t & \underline{\hat{\delta}}^t & \ldots \\ & & \vdots & & & \\ \underline{\hat{\delta}}^t & \underline{\hat{\delta}}^t & \ldots & \underline{0}^t & \underline{0}^t & \ldots \\ \underline{\hat{\delta}}^t & \underline{\hat{\delta}}^t & \ldots & \underline{0}^t & \underline{0}^t & \ldots \\ & & \vdots & & & \end{bmatrix} \quad (1)$$

and $$\vec{\varphi}_1 = \frac{\sqrt{2}}{K} \begin{bmatrix} \underline{\hat{\delta}}^t & \underline{\hat{\delta}}^t & \ldots & \underline{0}^t & \underline{0}^t & \ldots \\ \underline{\hat{\delta}}^t & \underline{\hat{\delta}}^t & \ldots & \underline{0}^t & \underline{0}^t & \ldots \\ & & \vdots & & & \\ \underline{0}^t & \underline{0}^t & \ldots & \underline{\hat{\delta}}^t & \underline{\hat{\delta}}^t & \ldots \\ \underline{0}^t & \underline{0}^t & \ldots & \underline{\hat{\delta}}^t & \underline{\hat{\delta}}^t & \ldots \\ & & \vdots & & & \end{bmatrix} \quad (2)$$

where $\sqrt{2}/K$ is a normalizing factor such that the dot product of a basis vector with itself equals one, and where $\underline{\hat{\delta}}$ indicates a unit color space direction.

The construction of the signal blocks as linear combination of the basis vectors may be formally expressed as $$\vec{s}_i[m,n] = \sum_{j=0}^{N-1} s_{ij} \vec{\varphi}_j[m,n] \quad (3)$$

where the $j^{th}$ coefficient for the $i^{th}$ signal block is $$s_{ij} = \sum_{m=0}^{K-1}\sum_{n=0}^{K-1} (\vec{s}_i[m,n])^t \vec{\varphi}_j[m,n] \quad (4)$$

A signal vector is a vector representation of a signal block $\vec{s}_i[m,n]$ indicating the coefficients that weight the component functions of the basis vectors. A signal vector may be formally expressed as $$\underline{s}_i = [s_{i0}\ s_{i1}\ \ldots\ s_{iN-1}]^t \in \Re \quad (5)$$

where $\Re$ is the set of real numbers. Note again that a bold underlined lowercase letter is used to denote a regular vector. Since the basis vectors $\vec{\varphi}_j$ are orthonormal, discrete 2D vector-valued functions, i.e., a K×K matrix of 3D color vectors, one may consider $\vec{\varphi}_j \in \Re$. The basis functions are orthonormal because $$\sum_{m=0}^{K-1}\sum_{n=0}^{K-1} (\vec{\varphi}_i[m,n])^t \vec{\varphi}_j[m,n] = 0, i \neq j \quad (6)$$

$$\sum_{m=0}^{K-1}\sum_{n=0}^{K-1} (\vec{\varphi}_i[m,n])^t \vec{\varphi}_j[m,n] = 1, i = j. \quad (7)$$

Note that the inner product of these 2D basis functions is computed by taking the dot product of corresponding elements.

The message symbol $m_0$, denoting a message value of "0", is represented with the signal block $\vec{s}_0 = \eta \vec{\varphi}_0 - \eta \vec{\varphi}_1$ and the message symbol $m_1$, denoting a message value of "1", is represented with the signal block $\vec{s}_1 = -\eta \vec{\varphi}_0 + \eta \vec{\varphi}_1$ where $\eta = \delta^* K/\sqrt{2}$ and $\delta$ is a scalar magnitude, or amplitude, of the unit color modulation $\hat{\underline{\delta}}$. Each signal block $\vec{s}_i$ is a K×K array of three vectors of value $\pm \underline{\delta}$, where $\underline{\delta} = \delta \cdot \hat{\underline{\delta}}$. The signal vectors are then $\underline{s}_0 = [\eta - \eta]^t$ and $\underline{s}_1 = [-\eta \eta]^t$.

5. Constructing unique 2D signal block configurations

The functions of the basis vectors can be graphically illustrated as "basis blocks"; this graphical representation is useful in order to illustrate how basis vectors are combined to form signal blocks. The functional characteristics of a signal block are simply that it be composed of at least two subregions that are differentiated by color. A further requirement is that a signal block has an average color difference of $\underline{0}$. That is, the area-weighted color average of all of the colors within an output signal block, i.e., the sum of the colors weighted by their respective area within the output signal block divided by the sum of the areas, is the reference color, $\underline{c}$, used to determine the color modulations. The basis functions must be defined to comply with this requirement.

Figure 15:
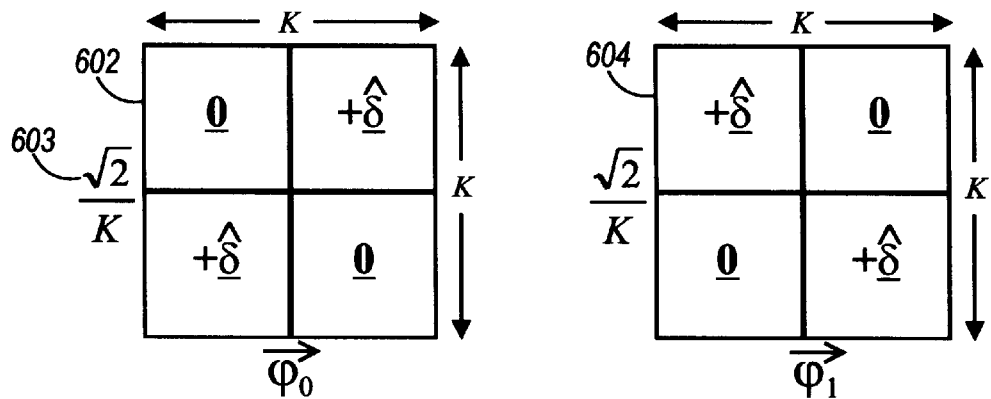
FIG. 15 shows two basis blocks that graphically illustrate the two vector-valued basis functions used to construct the signal blocks of FIG. 2 according to an illustrated embodiment of the encoding technique of the present invention.
Figure 16:
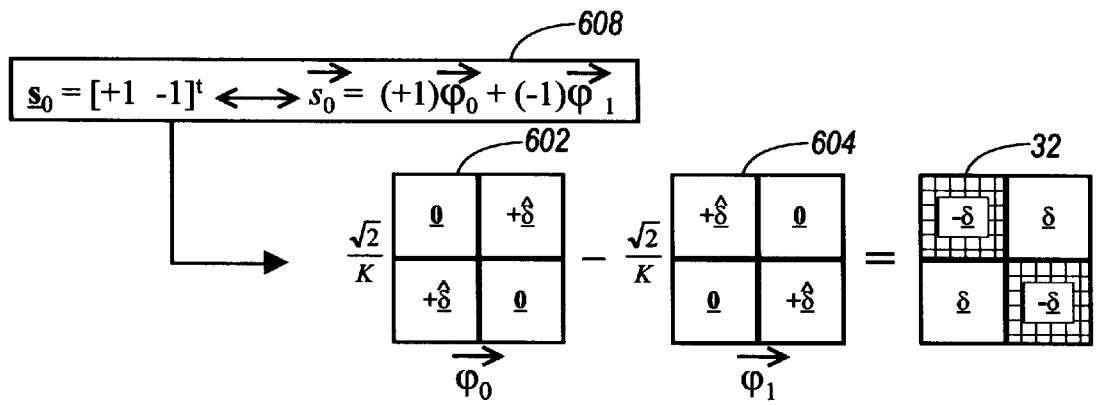
FIGS. 16 and 17 schematically illustrate how the signal blocks of FIG. 2 are constructed from the basis functions illustrated in FIG. 15, and further shows a signal vector representation of each signal block, according to an illustrated embodiment of the encoding technique of the present invention.
Figure 17:
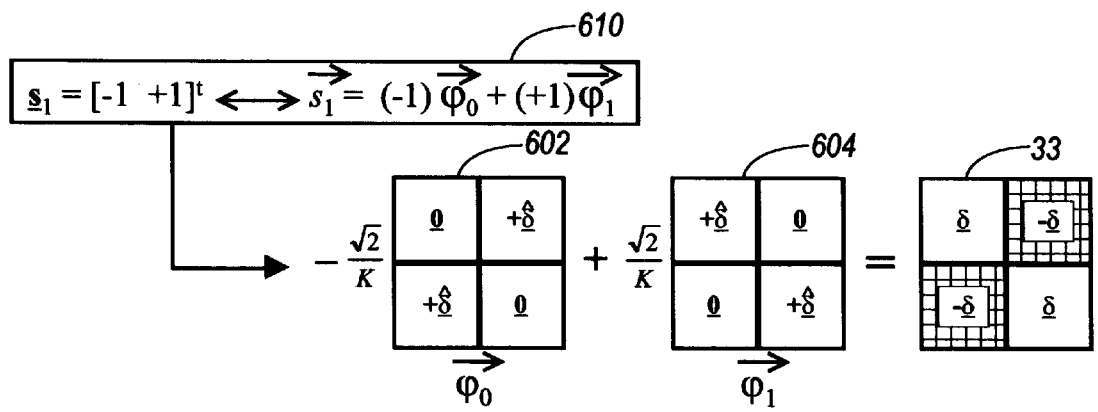

FIG. 15 includes two basis blocks 602 and 604 that illustrate the set of two basis vectors, $\vec{\varphi}_0$ and $\vec{\varphi}_1$ used to construct signal blocks 32 and 33 illustrated in FIG. 2. Basis blocks 602 and 604 define a K×K color image having four square subregions; two of the subregions have no color modulation and so have no color difference quantity specified, denoted as $\underline{0}$. The other two subregions in each basis block 602 and 604 have a positive unit color space direction $+\hat{\underline{\delta}}$. Each basis block 602 and 604 has a unique spatial arrangement of the subregions labeled $\underline{0}$ and $+\hat{\underline{\delta}}$ as shown in the figure. Signal vectors 608 and 610 are defined to be $\underline{s}_0 = [+1\ -1]^t \leftrightharpoons \vec{s}_0 = (+1)\vec{\varphi}_0 + (-1)\vec{\varphi}_1$ and $\underline{s}_1 = [+1\ -1]^t \leftrightharpoons \vec{s}_1 = (+1)\vec{\varphi}_0 + (-1)\vec{\varphi}_1$, where the $\leftrightharpoons$ indicates the association between the signal vector and the signal block. These signal vectors define two uniquely patterned color modulated signal blocks by forming the linear weighted sums of the basis vectors using the coefficients in the signal vectors. FIGS. 16 and 17 illustrate the signal block construction process and the resulting signal blocks 32 and 33.

Figure 18:
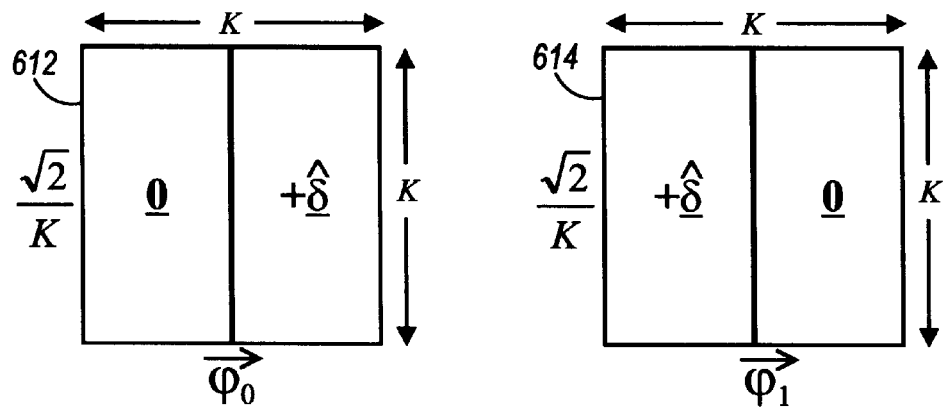
FIG. 18 shows two basis blocks that graphically illustrate the two vector-valued basis functions used to construct the signal blocks of FIG. 13 having a one-dimensional pattern for use in encoding a message according to the present invention.
Figure 19:
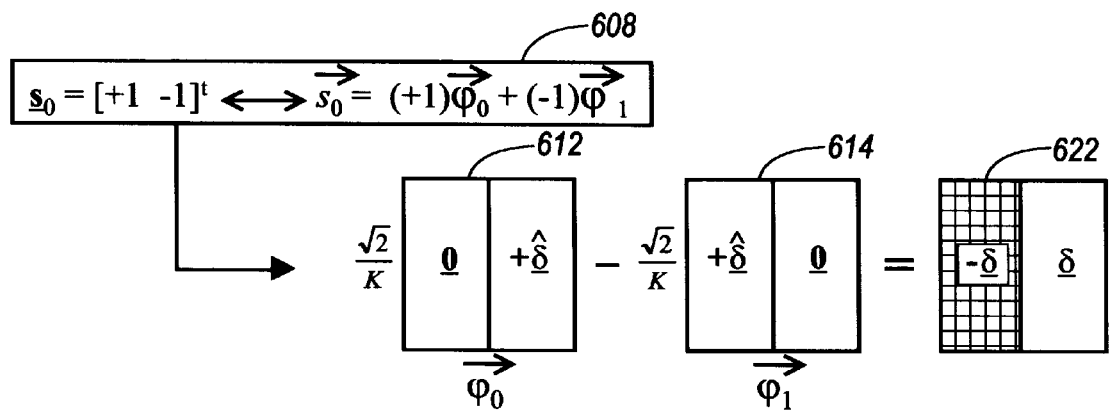
FIGS. 19 and 20 schematically illustrate how the signal blocks of FIG. 13 are constructed from the basis functions illustrated in FIG. 18, and further shows a signal vector representation of each signal block, according to an illustrated embodiment of the encoding technique of the present invention.
Figure 20:
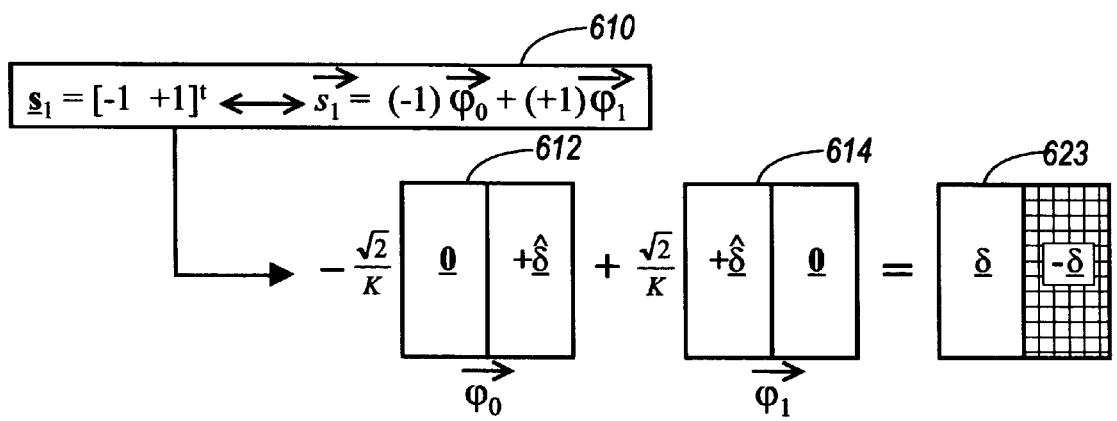

FIG. 18 illustrates still another example of two basis blocks graphically representing another pair of basis functions. Basis blocks 612 and 614 define a K×K color image having two rectangular subregions; one of the subregions has no color modulation, denoted as $\underline{0}$. The other subregion in each basis block 612 and 614 has a positive unit color space direction $+\hat{\underline{\delta}}$. Each basis block 612 and 614 has a unique spatial arrangement of the subregions labeled $\underline{0}$ and $+\hat{\underline{\delta}}$ as shown in the figure. Signal vectors 608 and 610 in FIGS. 19 and 20 are defined as $\underline{s}_0 = [+1\ -1]^t \leftrightharpoons \vec{s}_0 = (+1)\vec{\varphi}_0 + (-1)\vec{\varphi}_1$ and $\underline{s}_1 = [+1\ -1]^t \leftrightharpoons \vec{s}_1 = (+1)\vec{\varphi}_0 + (-1)\vec{\varphi}_1$, and are the same signal vectors defined in FIGS. 16 and 17. Signal vectors 608 and 610 define two uniquely patterned color modulated signal blocks by forming the linear weighted sums of the basis vectors using the coefficients in the signal vectors. FIGS. 19 and 20 illustrate the signal block construction process and the resulting signal blocks 622 and 623. Note that signal blocks 622 and 623 in FIGS. 19 and 20 resemble the 1D signal blocks 632 and 633 of FIG. 13 that have an arbitrary height dimension; however, signal blocks 622 and 623 are spatially limited to be K×K color images in the encoded image and are decoded as 2D signal blocks.

Figure 21:
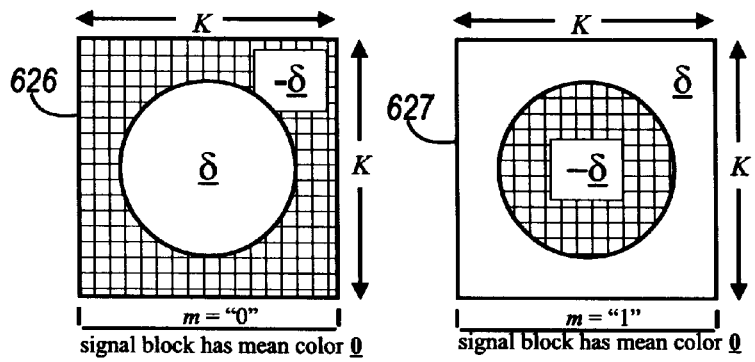
FIG. 21 illustrates another example of a pair of signal blocks that are suitable for encoding messages using the technique of the present invention.

FIG. 21 illustrates an example of a pair of signal blocks 626 and 627 with another suitable subregion configuration. Signal blocks 626 and 627 encode data items having the possible values of "0" and "1". Each signal block has two subregions indicating the color modulations of $\pm \underline{\delta}$. Each subregion has approximately the same surface area as the other so that the two color modulations may average to a third color, the reference color.

Figure 22:
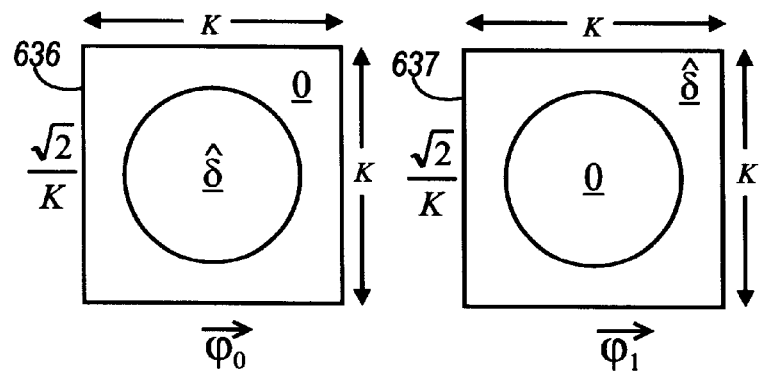
FIG. 22 graphically illustrates the basis blocks used to construct the signal blocks of FIG. 21.
Figure 23:
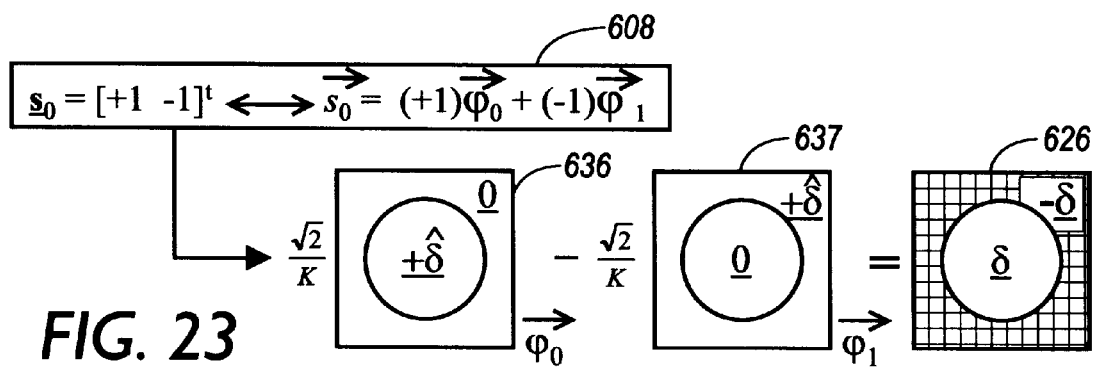
FIGS. 23 and 24 schematically illustrate how the signal blocks of FIG. 21 are constructed from the basis functions illustrated in FIG. 22, and further shows a signal vector representation of each signal block, according to an illustrated embodiment of the encoding technique of the present invention.
Figure 24:
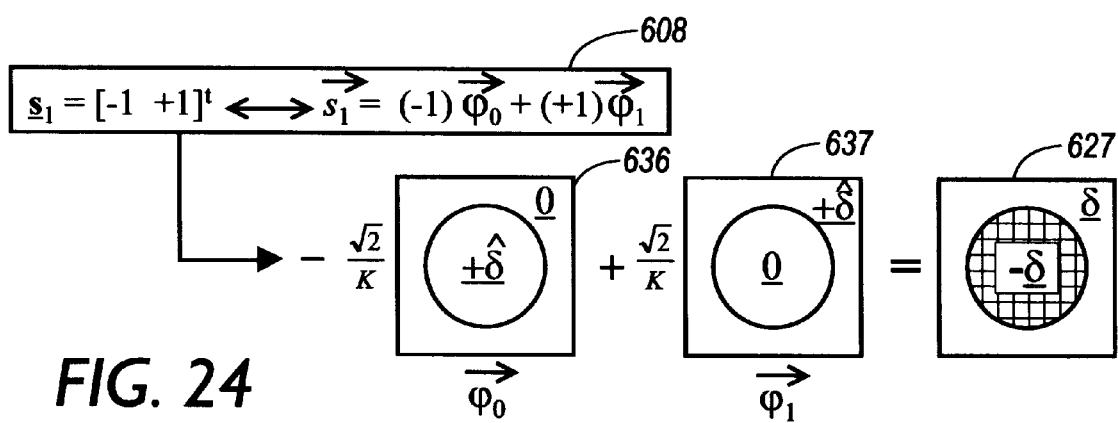

FIG. 22 illustrates two basis blocks graphically representing the pair of basis functions that are used to construct signal blocks 626 and 627. Basis blocks 636 and 637 define a K×K color image having two dissimilarly shaped subregions; the innermost subregion has a positive unit color space direction $+\hat{\underline{\delta}}$. The other outermost subregion in each basis block 636 and 637 has no color modulation, denoted as $\underline{0}$. Each basis block 636 and 637 has a unique spatial arrangement of the subregions labeled $\underline{0}$ and $+\hat{\underline{\delta}}$ as shown in the figure. Signal vectors 608 and 610 in FIGS. 23 and 24 are the same signal vectors defined in FIGS. 16 and 17 and FIGS, 19 and 20 as $\underline{s}_0 = [+1\ -1]^t \leftrightharpoons \vec{s}_0 = (+1)\vec{\varphi}_0 + (-1)\vec{\varphi}_1$ and $\underline{s}_1 = [+1\ -1]^t \leftrightharpoons \vec{s}_1 = (+1)\vec{\varphi}_0 + (-1)\vec{\varphi}_1$ and define two uniquely patterned color modulated signal blocks by forming the linear weighted sums of the basis vectors using the coefficients in the signal vectors. FIGS. 23 and 24 illustrate the signal block construction process and the resulting signal blocks 626 and 627.

Figure 25:
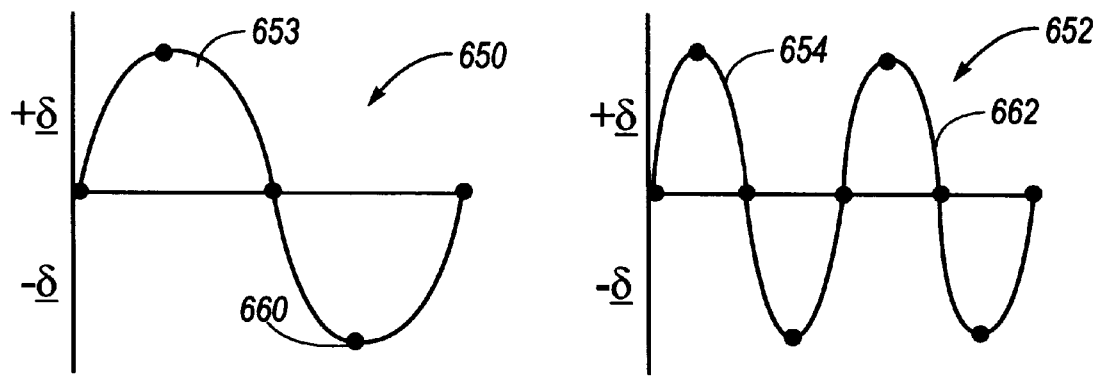
FIG. 25 illustrates two sine functions having different periods that may be used as basis functions to construct unique signal blocks suitable for use in encoding messages using the technique of the present invention.
Figure 26:
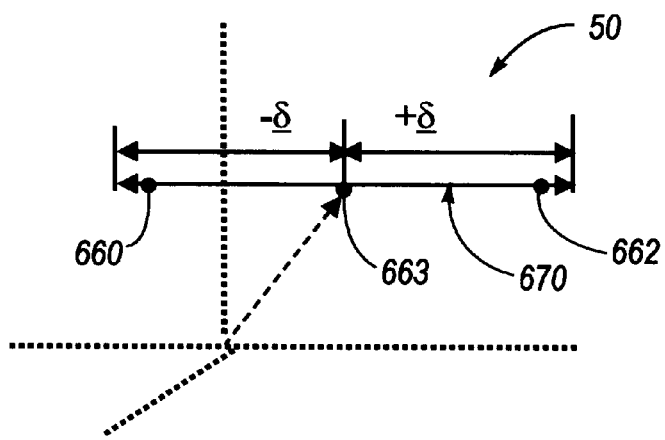
FIG. 26 shows a multi-dimensional color space and schematically illustrates how the sine functions of FIG. 25 are used to determine color modulation along a color space direction in the color space.
Figure 27:
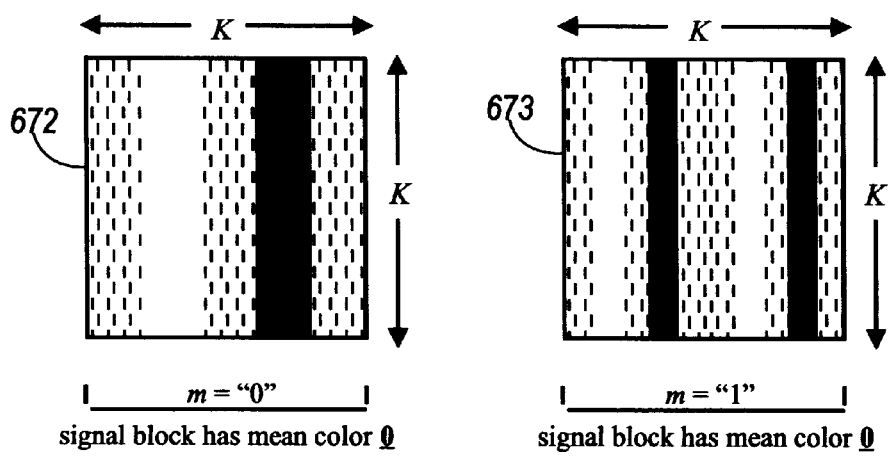
FIG. 27 illustrates a pair of signal blocks constructed using the two sine functions of FIG. 25 and suitable for use in encoding messages using the technique of the present invention.

As can be seen by the previous examples of signal blocks that have been described, the pattern formed by the size and shape of the color modulated subregions of a signal block is determined by the basis functions and may take on a wide variety of configurations. FIGS. 25, 26 and 27 illustrate still another possible color pattern configuration. The basis functions of a signal block may provide for a set of small subregions with smoothly varying color modulations instead of the larger, constant-colored subregions illustrated in the previous examples. The small subregions with smoothly varying color modulations are produced when the basis functions specify that the magnitude of the deviation from the reference color along a color space direction in the color space vary, as opposed to remaining constant, at discrete sample points. FIG. 25 illustrates graphs 650 and 652 of two sinusoids 653 and 654 that provide values for color space direction $\hat{\underline{\delta}}$. The small black circles represent data points on the graphs, with data points 660 and 654 being called out as specific examples. FIG. 26 shows 3D color space 50 with color space direction 670 that includes reference color 663. Colors to the right of reference color 663 are modulations in the $+\hat{\underline{\delta}}$ direction and include color 662 from graph 652 of FIG. 25. Colors to the left of reference color 663 are modulations in the $-\hat{\underline{\delta}}$ direction and include color 660 from graph 650 of FIG. 25. It can be seen that the data points on graphs 650 and 652 provide a varying range of magnitudes of deviation from the reference color along color space direction 670. The basis functions that implement the functions together with signal vectors of the type used in the previous examples produce signal blocks with small, smoothly varying subregions of the type shown in FIG. 27. These are valid signal blocks because they meet the requirements of being a linear combination of a set of orthonormal basis functions and they further illustrate the wide range of signal blocks that may be designed within the context of the present invention. Note also that basis functions with sinusoidal variation in the orthogonal spatial dimension are also suitable for defining signal blocks.

6. Expanding the encoding capability by creating more than two unique signal blocks a. Defining basis functions having two color modulations in a single color space direction The signal blocks illustrated and described to this point implement the encoding of a pair of message data values such as, for example, would be useful in the encoding of data represented as sequences of "0" and "1" in a binary coding scheme. Each signal block illustrated and described to this point encodes one message data item by encoding one of the two permitted data values in the coding scheme. This encoding is accomplished by (1) defining a pair of orthonormal basis functions that represent a single color modulation, $\hat{\underline{\delta}}$, around a reference color in a single color space direction, and by (2) using an orthogonal pairing of weights defined in a pair of signal vectors to represent the magnitude δ of unit color modulation $\hat{\underline{\delta}}$, around the reference color in the single color space direction. Refer back, for example to the pair of basis functions illustrated by the basis blocks in FIG. 15 that show unique spatial patterns of color modulation $+\hat{\underline{\delta}}$. Signal vectors 608 and 610 in FIGS. 16 and 17 are defined as $\underline{s}_0=[+1-1]^t$ and $\underline{s}_1=[-1+1]^t$, the weighted linear sums of the basis functions, and thus define the two unique signal blocks 32 and 33 for use in encoding data represented in a binary coding scheme. Note that two additional signal vectors $\underline{s}_2=[+1+1]^t$ and $\underline{s}_3=[-1-1]^t$ theoretically could be defined for the basis functions illustrated in FIG. 15; these signal vectors would produce a signal block of a solid color having a $+\hat{\underline{\delta}}$ color modulation from the reference color and a signal block of solid color having a $-\hat{\underline{\delta}}$ color modulation from the reference color, neither of which satisfies the definition of a signal block nor would be particularly useful for encoding purposes. Note also that it can be seen in signal blocks 32 and 33 that the use of both positive (+1) and negative (−1) weightings on the basis functions in effect results in color modulations that vary in both the $+\hat{\underline{\delta}}$ and the $-\hat{\underline{\delta}}$ directions around the reference color in the single color space direction when the basis functions are defined in terms of only a single $+\hat{\underline{\delta}}$ color modulation.

Figure 28:
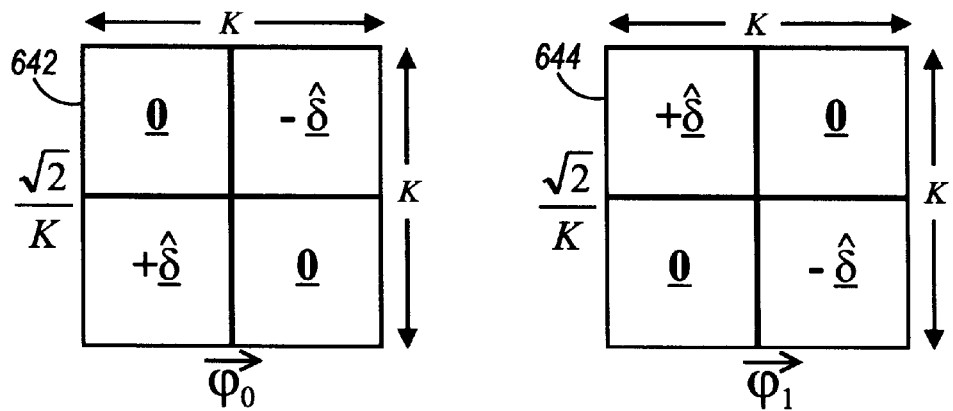
FIG. 28 graphically illustrates another pair of vector-valued basis functions as basis blocks that may be used to construct unique signal blocks suitable for use in encoding messages using the technique of the present invention.
Figure 29:
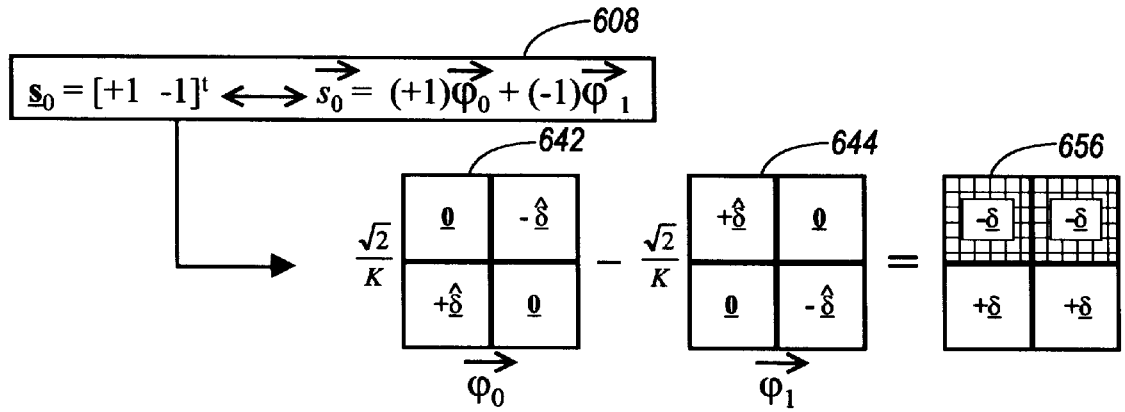
FIGS. 29, 30, 31 and 32 schematically illustrate how unique signal blocks are constructed from the basis functions illustrated in FIG. 28, and further shows a signal vector representation of each signal block, according to an illustrated embodiment of the encoding technique of the present invention.
Figure 30:
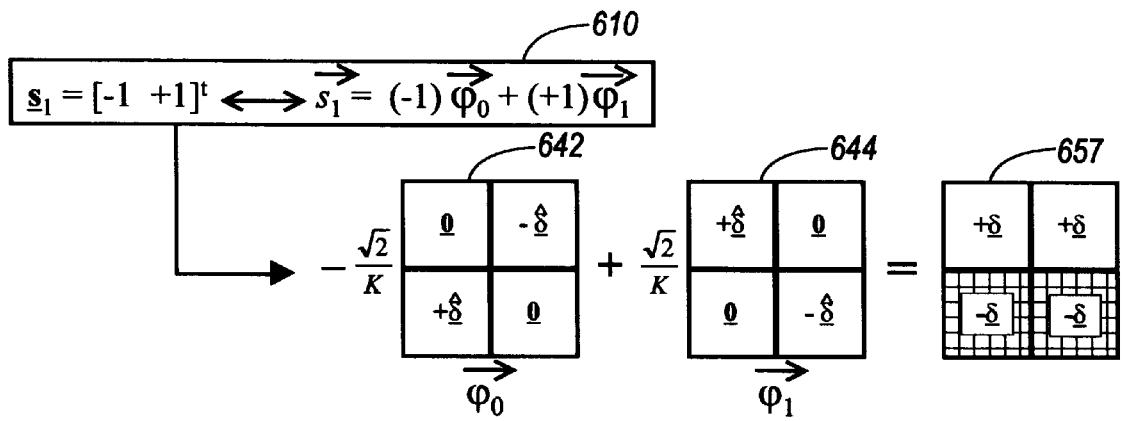
Figure 31:
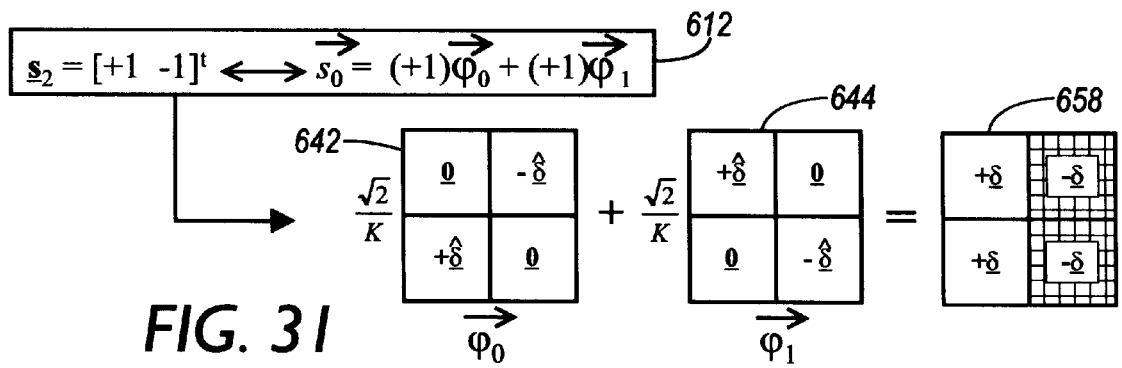
Figure 32:
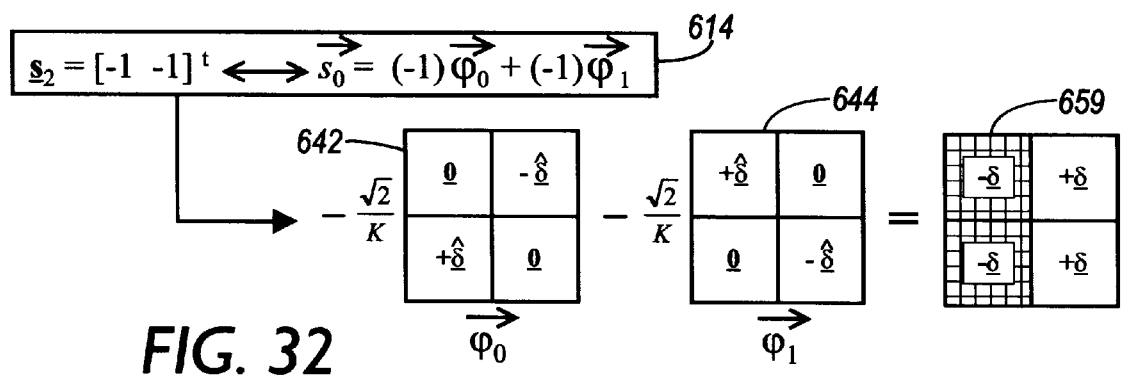

By introducing in the basis functions a second color modulation $-\hat{\underline{\delta}}$ around the reference color in the single color space direction, a set of four unique signal blocks may be created by defining signal vectors having exactly the four unique weighting variations on the basis functions just described: $\underline{s}_0=[+1-1]^t$; $\underline{s}_1=[-1+1]^t$; $\underline{s}_2=[+1+1]^t$; and $\underline{s}_3=[-1-1]^t$. FIGS. 28–32 illustrate this encoding implementation. FIG. 28 shows basis blocks 642 and 644 illustrating the basis functions having color modulations that vary in both the $+\hat{\underline{\delta}}$ and $-\hat{\underline{\delta}}$ directions, each arranged in a unique spatial pattern. FIGS. 29–32 illustrate the four unique signal blocks 656, 657, 658, and 659 created as weighted linear sums of the basis functions by the four possible signal vectors. Signal blocks 656, 657, 658, and 659 are each composed of at least two subregions that are differentiated by color. It can be observed that the total surface area of the first-colored subregion in each of these signal blocks is substantially equal to the total surface area of the second-colored subregion, and thus each meets the functional requirements of a signal block as previously defined. The matrices representing the two basis vectors $\vec{\phi}_0$ and $\vec{\phi}_1$ for this implementation are straightforwardly derived from Equations (1) and (2) and are omitted here.

Figure 33:
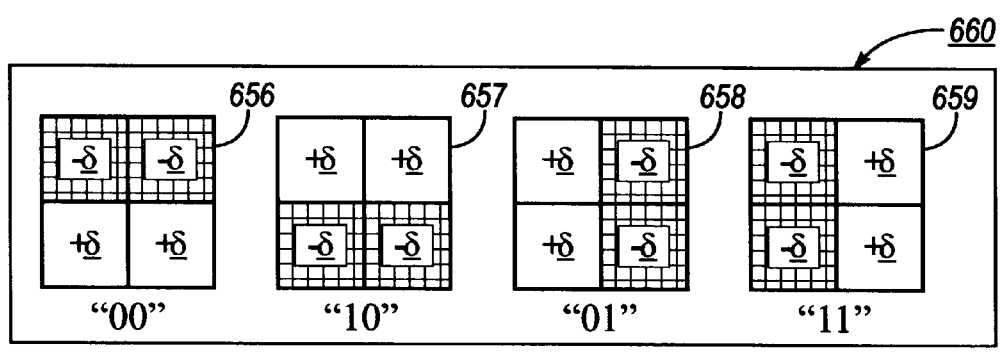
FIG. 33 illustrates a first encoding scheme for assigning message values to the signal blocks of FIGS. 29, 30, 31 and 32 wherein a single signal block encodes two data values in a binary encoding scheme.
Figure 34:
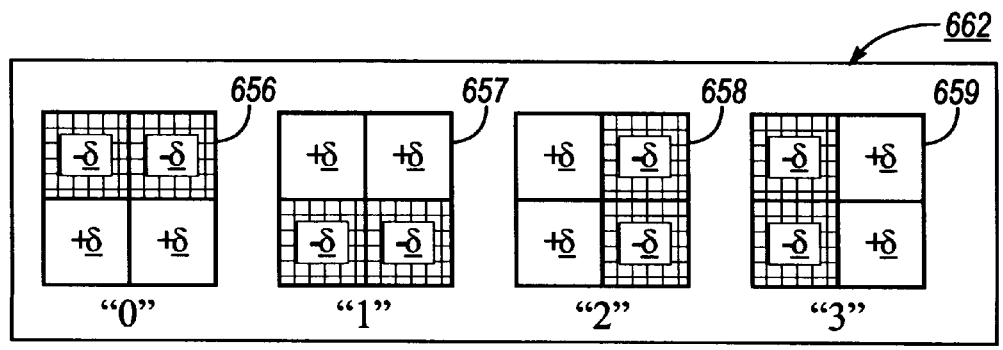
FIG. 34 illustrates a second encoding scheme for assigning message values to the signal blocks of FIGS. 29, 30, 31 and 32 wherein the set of four unique signal blocks encodes an encoding scheme having four values.

Having four unique signal blocks enables the encoding of message data items in two distinct ways. The binary data values in a binary coding scheme may be combined in unique pairs to encode multiple message data items in a single signal block, such as shown by way of example in encoding implementation 660 of FIG. 33. Alternatively, the four unique signal blocks may encode message data represented in a coding scheme having four unique data values, such as shown by way of example in encoding implementation 662 of FIG. 34.

b. Defining basis functions using multiple orthogonal color space directions

Both of the encoding implementations illustrated in FIGS. 15–17 (i.e., encoding message data represented in a two-value coding scheme) and in FIGS. 28–34 (i.e., encoding message data represented in a four-value coding scheme or encoding multiple message data items in a single signal block) may be further extended. In addition to signal blocks having color modulation $\pm\hat{\underline{\delta}}$ in a first color space direction, a pair of second color modulations, designated as $\pm\hat{\underline{\mu}}$, may be specified around the reference color of a signal block in a second color space direction orthogonal to $\hat{\underline{\delta}}$. All of the previously introduced concepts of basis functions, signal vectors and uniquely-patterned signal blocks are straightforwardly extended to include color variations in a second color space direction. This encoding implementation is illustrated in FIGS. 35–39. FIG. 35 shows the four basis functions as illustrated by their graphical basis block representations 682, 684, 642 and 644. Basis functions 642 and 644 are identical to those illustrated in FIG. 28 and represent color modulations in the first color space direction. Basis functions 682 and 684 represent color modulations in the second, orthogonal color space direction. FIG. 36 illustrates the set 688 of signal vectors that define the uniquely patterned signal blocks using variations of the weights on the basis functions. The four basis functions 682, 684, 642 and 644 allow for a total of 16 signal blocks to be defined. FIGS. 37 and 38 illustrate how signal blocks 692 and 696 are defined from signal vectors $\underline{s}_0$ and $\underline{s}_9$ respectively, and FIG.

39 illustrates the set 698 of 16 uniquely patterned signal blocks that are generated from set 688 of signal vectors. Some or all of the signal blocks in set 698 of signal blocks may be used in a manner analogous to that shown in FIGS. 33 and 34 to encode in a single signal block a single message data item representing data encoded in a coding scheme having up to 16 values, or may be used to encode multiple message data items in a single signal block for other coding schemes.

Note that, when the goal of encoding is to produce substantially imperceptible encoded data, the second color space direction is computed to be the second-most optimal orthogonal color space direction from among all possible color space directions orthogonal to the first color space direction computed.

7. Implementation notes a. Practical signal block design issues

There are three interrelated factors that need to be taken into account when designing the signal blocks to be used for encoding according to any of the implementations just described. These are the physical limitations of the marking device, the desire to minimize perceived distortion in the encoded image, and the ability to recover (i.e., decode) the message from an encoded image.

An important feature of the signal blocks as defined in the examples is that they are designed to have zero ($\underline{0}$) mean color so that when an input color $\underline{c}$ is modulated according to the spatial pattern of a selected signal block to encode a data value, there is little or no perceived color distortion in the image. To a certain extent, then, there is a practical requirement for successfully using the encoding technique that the differently-colored subregions comprising a signal block must be large enough to be accurately produced by a particular marking device such as a color printer. Thus, the actual size of a signal block and its component subregions in any of the implementations described herein is ultimately a function of the resolution limits of the marking device.

Figure 40:
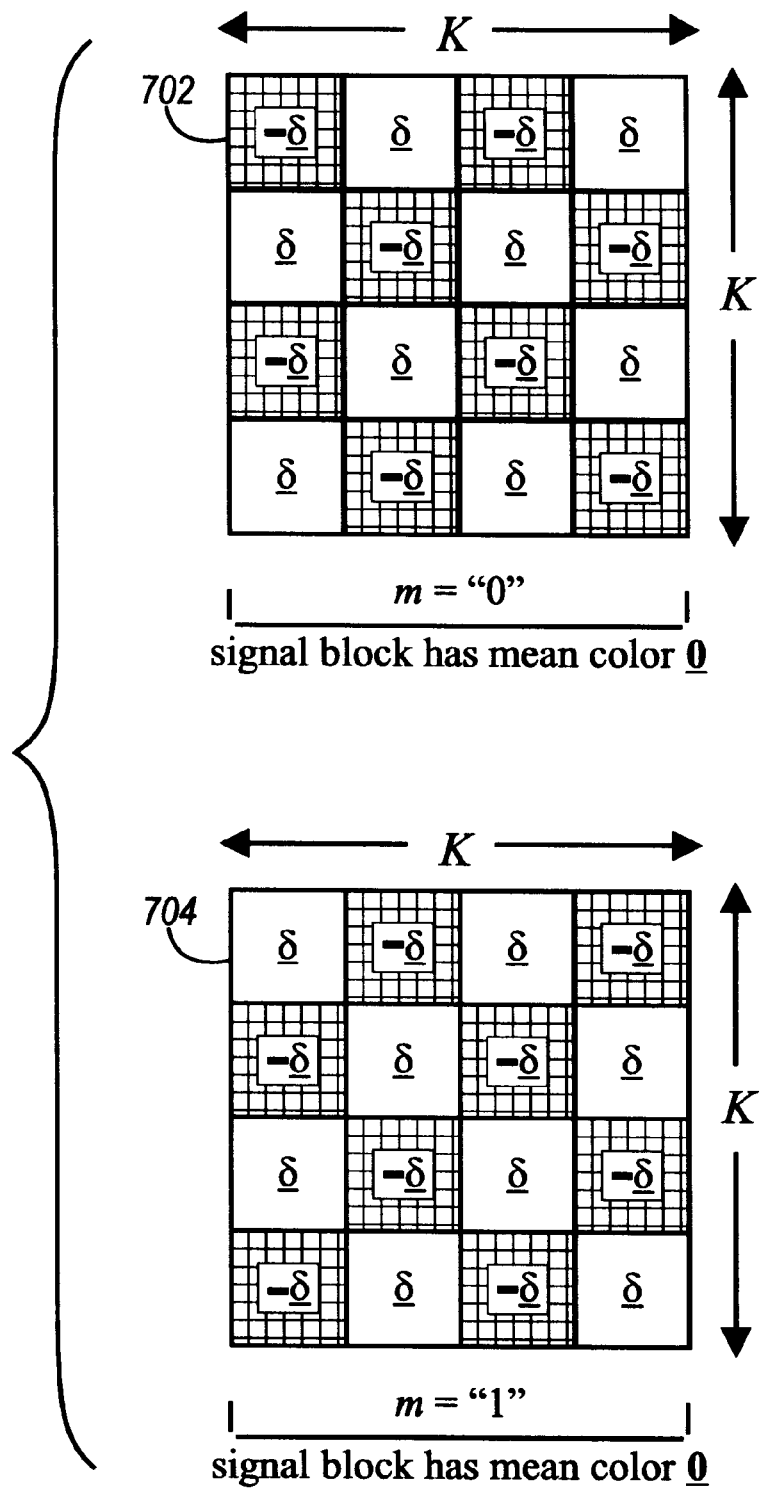
FIG. 40 schematically illustrates a variation of the signal blocks of FIG. 2 in which the unique color modulated signal block pattern is shown at a higher spatial frequency in the same size signal block.

It may be desirable to increase the spatial frequencies of, and thereby reduce the size of, the differently-colored subregions of constant color within a signal block, subject to the physical limitations of the marking device. Increasing the spatial frequency of the color-modulated subregions aids in decreasing the visibility of the signal blocks to human viewers, thus minimizing perceptual distortion in the image, without, in principle, decreasing the signal to noise ratio. FIG. 40 illustrates by way of example signal blocks 702 and 704 which are versions of signal blocks 32 and 33 of FIG. 2 each having a higher spatial frequency of color-modulated subregions. Signal blocks 702 and 704 may be used in place of signal blocks 32 and 33 to encode the message in message array 22 of FIG. 4 to produce a message image, M, in the same manner that signal blocks 32 and 33 are used in FIG. 4.

Increasing spatial frequencies of subregions within a signal block without increasing the size of the signal block, however, may complicate decoding. Increasing the size of the signal block and simultaneously maintaining a high subregion spatial frequency should increase the signal to noise ratio for decoding purposes while still minimizing perceptible image distortion. However, it must also be taken into account that the use of basis functions in those implementations that generate essentially square subregions introduces high frequencies into the image that were not there before. Smoother basis functions, such as the sinusoid implementation of FIGS. 25–27, generate subregions where the amplitude of the variation goes to zero at the block boundaries and thus do not introduce edges into the image.

Implementers will need to experiment with these three factors to find the optimal balance for their particular application.

b. Printer and scanner calibration

The ability of a marking device to accurately produce the modulated colors in an output signal block during the encoding operation, and the ability of a digital image capture device to accurately detect the modulated colors in a signal cell during the decoding operation, are device color calibration issues. For purposes of an implementation of the encoding and decoding operations described herein, scanner and printer calibration was done in a highly empirical manner. For a small subset of K colors of the discrete RGB color space, a lookup table with tetrahedral interpolation was constructed mapping between RGB values sent to the printer and the RGB values sensed by the scanner. A discrete sampling of the size n neighborhood of each of the K colors was constructed by printing and scanning color targets of the nK discrete colors.

To achieve a given scanner response, the bi-directional table was used to determine what RGB values should be sent to the printer. Note that this empirical calibration method does not take into consideration the human response to color modulations; to do so would involve more carefully modeling the spectral characteristics of the printed colors.

c. Signal blocks as formed from unique spatial modulation patterns

Figures 41, 42:
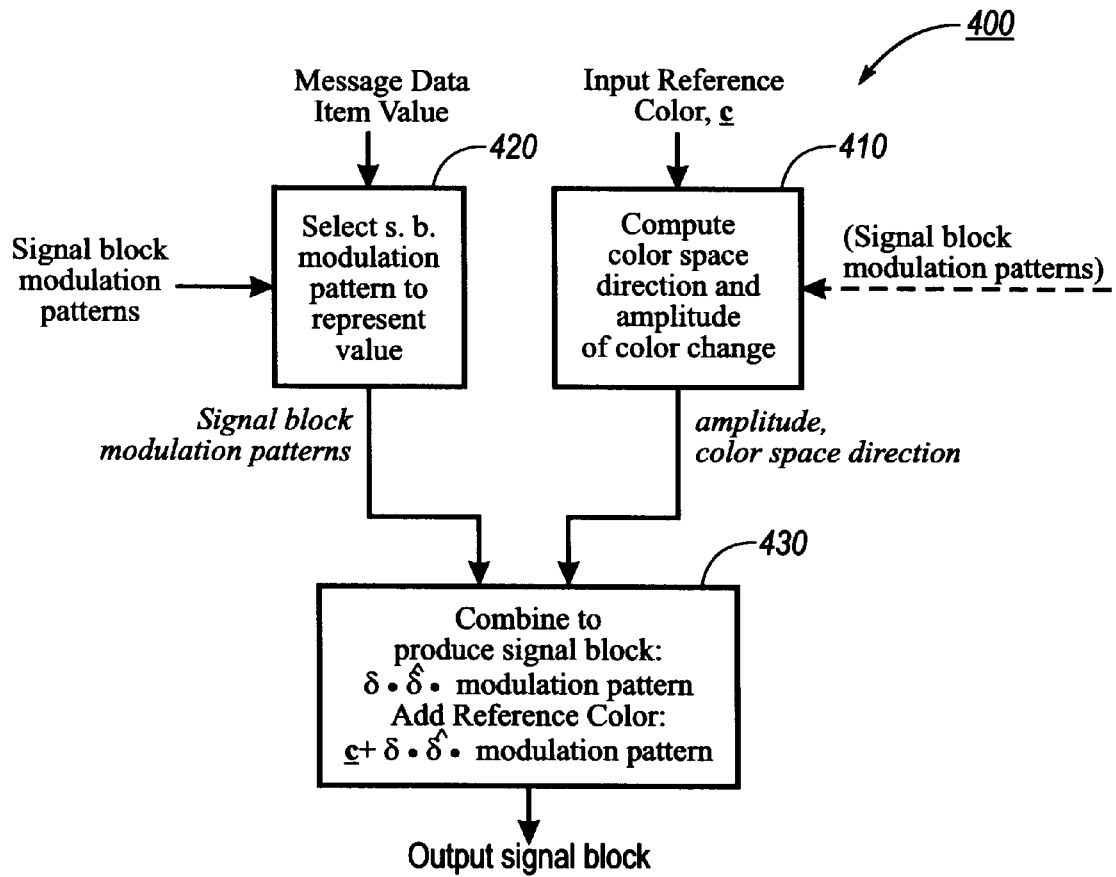
FIG. 41 schematically illustrates the components of producing an output signal block color image including multiplying a unique spatial pattern of scalars by a color space direction vector and adding an input reference color.
FIG. 42 is a block diagram illustrating the encoding operations for producing an output signal block according to signal block formation illustrated in FIG. 41.

The illustrations of signal blocks in the figures to this point (e.g., FIGS. 2, 27, 33, 34 and 39), show signal blocks to be unique patterns of color modulations, $\pm\underline{\delta}$. Illustrating signal blocks in this manner blends together the two inherent features of a signal block: the unique spatial (scalar) modulation pattern that represents the message data value, and the color space direction vector that controls the color modulation of a target, or reference, color. The color modulation causes an output signal block to have the target color as its overall mean color, thereby essentially hiding from view the unique modulation pattern that carries the message value. It is useful for further understanding of the invention to consider a second type of signal block illustration that explicitly separates the unique spatial modulation pattern of the signal block that carries the message value from the color modulation that is applied to a reference color for purposes of concealing the message. FIG. 41 shows modulation pattern data structure 333 as a unique spatial signal pattern 333 of scalars (e.g., ±1's). Modulation pattern 33 defines the size dimensions of an output signal block color image. The pattern of scalars indicate image locations in the output signal block color image of the modulated colors. The scalars are each multiplied by a unit color space direction vector 336, $\underline{\hat{\delta}}$, and amplitude (magnitude) scalar 338, $\delta$, and the result is then added to an input reference color $\underline{c}$ to produce output signal block 330 in an encoded image. An array of scalars, such as pattern 333, multiplied by a vector, such as unit color space direction 336, yields an array of vectors to which an input reference color $\underline{c}$ may be added to produce an image region in the form of output signal block 330. Output signal block 330 produced by the operation that uses modulation pattern 333 is equivalent to output signal block 85 of FIG. 9 produced by the operation that combines signal block 33 illustrated in FIG. 2 with a target color and modulates the colors in the signal block subregions accordingly.

FIG. 42 shows block diagram 400 of the encoding operations needed to produce an output signal block described in this manner. Block diagram 400 illustrates another embodiment of the encoding operation and is a variation of the embodiment shown in FIGS. 3 and 5. Operation 420 takes as input a message data item value and the set of valid modulation patterns and selects the appropriate modulation pattern to represent the message data value. Operation 410 takes as input a reference color and computes the color space direction and amplitude of modulation for the reference color, using the technique disclosed in copending U.S. patent application Ser. No. 08/956,326, or some other appropriate method. Note that, when signal block encoding is implemented using a fixed and constant color space direction vector and amplitude, operation 410 need not compute the color space direction and may be a null operation or simply return the fixed color space direction. Operation 430 combines the outputs of operations 410 and 420 to produce an output signal block color image as illustrated in FIG. 41 by modulating the input reference color according to the specified color space direction and amplitude in the selected modulation pattern. When the reference color is derived from an image region of an image into which the message data is to be embedded, the output signal block is placed into, or replaces, the image region to produce an encoded image. Note that this same construction applies to basis blocks as well.

In FIG. 42 operation 410 shows the signal block modulation patterns as an optional input. This is because the modulation pattern may influence the computation of the color space direction and amplitude of the reference color modulation. For example, when the spatial frequency of the modulation pattern increases and the individually color modulated regions in a signal block become smaller (see e.g. the signal blocks in FIG. 40), the human eye is less sensitive to the smaller color modulated regions in the signal block than it would be if the image regions were larger. The process for computing the color space direction can take this spatial frequency into account and place more weight on computing a color space direction and magnitude that produce color changes that are optimally detectable by a scanner for decoding purposes.

When operation 400 implements signal block encoding using more than one color space direction, such as, for example, the signal block example of FIG. 39, operation 420 treats the message data value as having multiple components and selects a signal block modulation pattern for each component. Operation 410 then computes multiple orthogonal color space directions using the input reference color. Operation 430 combines each selected signal block modulation pattern with a computed color space direction to form a signal block and these signal blocks are then additively combined to form a single output signal block. For example, the 16-valued coding scheme of FIG. 39 encodes four bits of data using two color space directions. An input message data value is treated as a four-bit message in two-bit component parts, and a signal block modulation pattern and color space direction is computed for each part.

8. Decoding the message from a color-modulated signal block encoded image a. Mathematical framework for decoding For purposes of the decoding discussion, new terminology is introduced: an "acquired image" is an image data structure that indicates an image that has been encoded with signal blocks according to the operations discussed above, and that has been produced by a digital image capture device processing a printed version of the encoded image. In the acquired image, an image region that is an encoded signal block is referred to as a "signal cell", to identify it as the output of a digital image capture operation and to distinguish it from an output signal block produced as a result of the encoding process. A signal cell is a color image that includes the color modulated image regions and has an average color. A "received signal block" is a signal cell that has been identified as a valid signal block and has had its average color subtracted from it, leaving a pattern of color difference quantities (color modulations).

Decoding the signal cells in an acquired color image also follows the classical vector-channel formulation of communications theory. The discussion of the mathematical framework of decoding the signal cells that follows assumes that the location and size of each signal cell has been previously determined and that the local average color has been subtracted off from each known signal cell, leaving only a series of received signal blocks with patterned color modulations. How the location and size of signal cells in an acquired image is determined is discussed in detail below. The explicit theoretical decoding problem is to determine, for each received signal block, which one of the set of valid signal blocks was used to modulate the original image in a particular local image region.

A received signal block, denoted as $\vec{r}[m,n]$, is a signal vector that is assumed to be corrupted by additive Gaussian noise. That is, $$\vec{r}[m,n] = \vec{s}[m,n] + \vec{n}[m,n] \tag{8}$$

The received signal vector and the noise signal vector are given respectively by $\underline{r} = [r_0\, r_1 \ldots r_{N-1}]^t \in \Re$ and $\underline{n} = [n_0\, n_1 \ldots n_{N-1}]$ where the $j^{th}$ coefficient of the received signal block is found from $$r_j = \sum_{m=0}^{K-1}\sum_{n=0}^{K-1} (\vec{r}[m,n])^t \vec{\varphi}_j[m,n] \tag{9}$$

and similarly for $n_j$. As already shown above in the discussion of the mathematical representation of signal blocks, a signal block is also represented as a signal vector. The advantage of this vector formulation for decoding is that a software implementation of decoding is made easier by working entirely in the signal vector domain to optimally estimate $\underline{s}$ from received vector $\underline{r}$ using the classical maximum a posteriori probability receiver formulation.

Let $x \sim N(\overline{x}, \sigma_x^2)$ denote that $x$ is a Gaussian random variable (or process) of mean $\overline{x}$ and variance $\sigma_x^2$. Assume that pixel noise is zero-mean, uncorrelated, additive Gaussian noise, independent of signal blocks $\underline{s}_i$. The digital image capture device that produces the input image data to be decoded is a 2D image sensor array that produces a color vector $\underline{c} \in \Re$ at each sensor location (pixel). Further assume that Gaussian noise is added in each color channel, and, for each pixel, is independent and identically distributed. This means that the noise component $\vec{n}$ is composed of $3K^2$ independent, identically distributed components: each element $\vec{n}[i,j]$ is a 3D noise vector whose 3 elements are random variables $n \sim N(0, \sigma^2)$.

For this case, it can be shown that message symbol $\hat{m} = m_i$ was sent when $$(\underline{r} - \underline{s}_i)^t (\underline{r} - \underline{s}_i) - 2\sigma^2 \ln P[m_i] \tag{10}$$

is minimal over all messages, where $P[m_i]$ is the a priori probability that message symbol $m_i$ was sent. Note that when there are only two discrete signal blocks, $P[m_i] = \frac{1}{2}$ for equally likely, equal-energy signals $\underline{s}_1$ and $\underline{s}_0$, and this reduces to finding the signal vector $\underline{s}_i$ closest to the received vector $\underline{r}$. In this $\underline{r}$ vector formulation, it follows that finding the signal vector $\underline{s}_i$ closest to the received vector $\underline{r}$ means seeking to maximize the dot product $\underline{r}^t\underline{s}_i$. Note that $\underline{r}^t\underline{s}_i=$ $$\underline{r}^t\underline{s}_i = \sum_{m=0}^{K-1}\sum_{n=0}^{K-1}(\vec{r}[m,n])^t\vec{s}_i[m,n].$$

That is, the optimal way to estimate the signal block sent from the signal block received is to compute the correlation of each of the valid signal blocks with an image region that has been identified as a received signal block. The signal block that correlates most highly with the received signal block is determined to be the signal block sent.

b. Decoding operation overview

Figure 43:
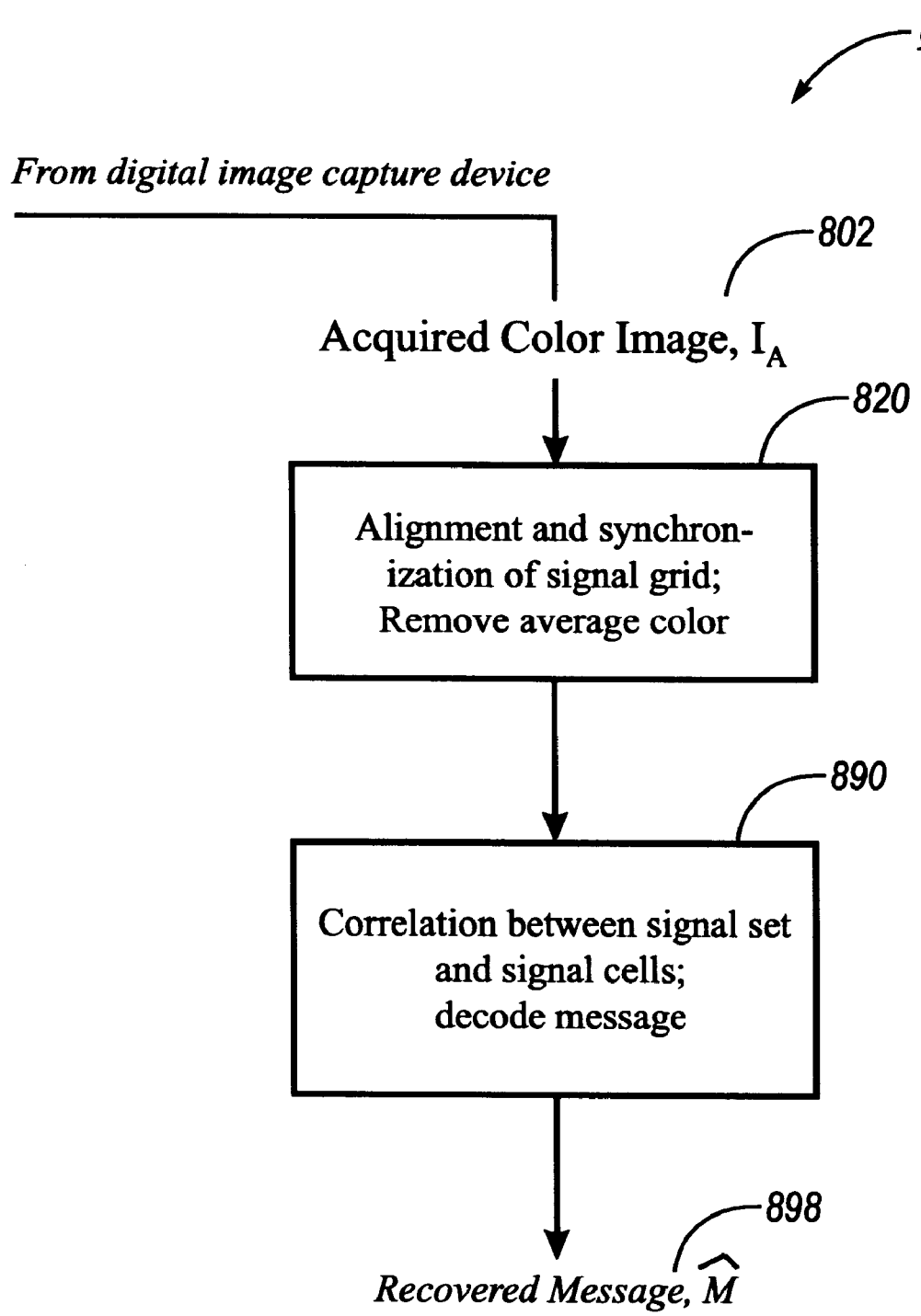
FIG. 43 is a flowchart illustrating the general operation of a decoding operation for decoding a message encoded using the encoding technique of the present invention.

FIG. 43 is a general block diagram of decoding operation 800 for decoding a message from an image that has been encoded with signal blocks according to the encoding technique illustrated in FIG. 1 and described above. Note that the grouping of functions into two operations 820 and 890 is for general illustrative purposes only and does not suggest any particular implementation of software subroutines. A particular software implementation of these functions may have more than two functions, and may group functions together differently than that shown in FIG. 43. The encoded image (e.g., image 80 of FIG. 5 or image 88 of FIG. 10) represented on a marking medium such as paper is processed by a digital image capture device such as a document scanner to produce an image data structure of the encoded image, referred to as the acquired image, $I_A$, 802. Preliminary to actual decoding of the signal cells it is necessary to determine their location and size in acquired image 802. Process 820 is composed of several component processes but is generally referred to as aligning and synchronizing the signal cells. First, during printing and subsequent scanning prior to decoding, the signal cells may become misaligned with image edges. Also, while the signal blocks were K×K in the original encoded image, the scale of the signal cells in the acquired image may be different. Thus, the orientation and scale of the signal cells must be determined. This process is generally referred to as "alignment" of the signal cells.

Once the orientation and scale of the signal cells are known, it is necessary to determine their locations. It was noted earlier in the discussion of 2D signal block encoding that encoded signal blocks can be viewed as forming a grid that is superimposed over (e.g., additively combined with) the original color image. The "signal grid" is defined to be an imaginary framework of grid lines on which signal cells in acquired image 802 are centered. When a group of output signal blocks is placed edge to edge in an image, it is relatively straightforward to find the constant colored subregions in the acquired image but it is not straightforward to group the subregions into valid signal blocks. It cannot be assumed that any set of adjacent subregions that form the shape of an expected signal block is a valid signal block in the signal set, since the juxtaposition of signal blocks in an encoded image can form a variety of subregion patterns, as can be observed, for example, in message image M of FIG. 4. Thus, it is possible to be "out of phase" with the signal blocks due to a translational shift by the width of a subregion in either direction in the acquired image. A process critical to decoding operation 820, then, is to synchronize the signal cells with the signal grid. In general this is accomplished by analyzing all possible phase shifts of the signal grid to find one with the smallest number of invalid signal blocks. Even with errors and noise in the acquired image, the analysis process will detect a large number of invalid signal blocks when the signal grid is out of phase with the actual received signal blocks encoded in the acquired image.

Figure 44:
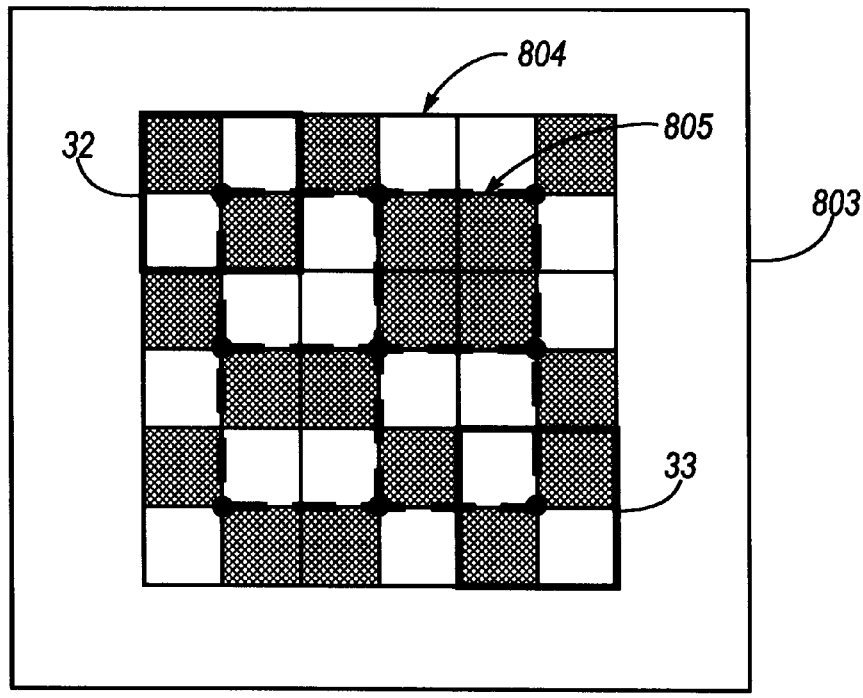
FIGS. 44 and 45 graphically respectively illustrate the operation of correctly and incorrectly synchronizing a signal grid framework to an encoded image to locate received signal cells during decoding.
Figure 45:
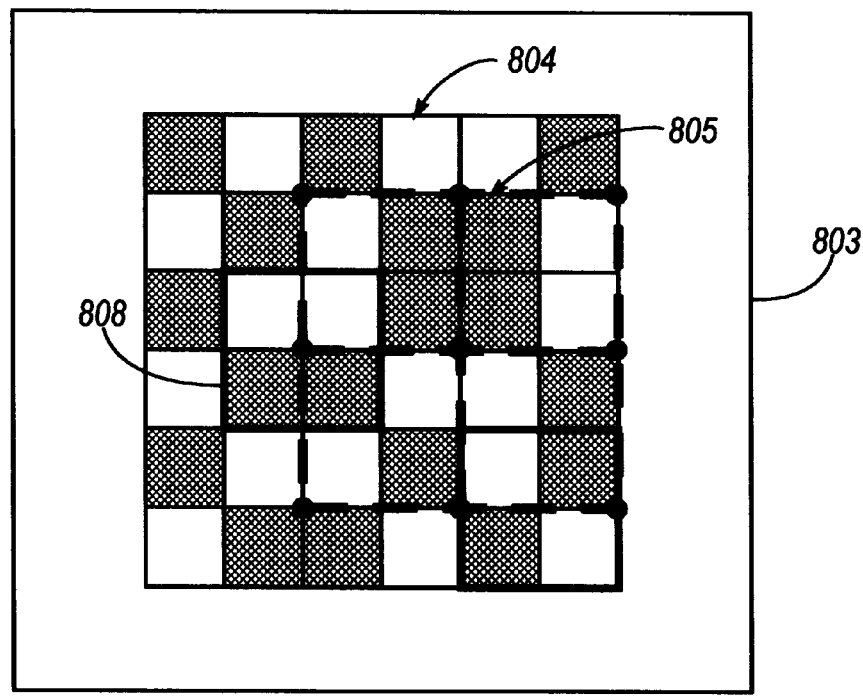

FIGS. 44 and 45 illustrate the importance in the decoding process of synchronization of the signal cells with the signal grid. FIG. 44 shows acquired image 803 having a collection 804 of signal cells that encode a message using the implementation illustrated in FIGS. 2–10. Collection 804 of signal cells is correctly synchronized with signal grid 805 in dashed lines. That is, the center of every signal cell in collection 804 lies on a grid point, as represented by the darkened circles. It can be seen from examination of the signal cells that each one is a valid one of the signal blocks 32 and 33 of FIG. 2. Contrast the synchronization shown in FIG. 44 with that shown in FIG. 45. If the synchronization process were to place signal grid 806 as shown, it can be seen that at least signal cell 808 in collection 804 is an invalid signal block in the signal set of FIG. 2.

Each signal cell in acquired image 802 is a valid signal block in the signal set with subregions that have colors modulated from the local color for that image region in the original color image according to the unique signal block pattern. For purposes of decoding acquired image 802, the local image color for the region occupied by the signal cell can be viewed as noise. What is essential to decoding is the pattern of the $\pm\delta$ (and, where applicable, the $\pm\mu$) modulations. Thus, once the locations and sizes of the signal cells are known, the local average color for each image region occupied by a signal cell is subtracted from the signal cell, leaving only a received signal block with the pattern of color modulation. Once the signal cells have been synchronized to the signal grid, and the local average color subtracted off in each signal cell, the locations and sizes of each received signal block in acquired image 802, denoted as data 842 in FIG. 43, are known and available to the next part of the decoding process.

Signal block identification proceeds, in box 890. Each valid signal block in the signal set is paired with a respective unique message value. Each identified received signal block in acquired image 802 is correlated with each of the valid and known signal blocks in the signal set that are expected to appear in acquired image 802. As each signal block in acquired image 802 is identified, the respectively paired message value it encodes may be determined and stored in memory as part of the final recovered message 898.

c. Alignment and synchronization

In an actual implementation of the decoding operation, it was assumed that the printer that produced the encoded image and the scanner that produced the acquired image were known, and that the resolution of the scanned image was also known. Therefore, the scale of the acquired image was assumed to be known. It was also further assumed that there was no skew in the scanned image.

When the scale and orientation of the acquired image are not known, conventional image processing techniques for deskewing an image and for finding image scale may be used. These conventional techniques typically require that an external document reference point, such as a border of the scanned image, be available. If such a reliable reference point or landmark is not available, it may be possible to find orientation and scale of the signal grid to analyze the high frequency components of the Fourier transform of the encoded acquired image. A strong peak of energy is expected at multiples of the signal grid frequency, in two orthogonal spatial directions. Finding the scale of the acquired image is critical to proper decoding, since the average color subtraction process requires that the dimensions of a signal cell be known. In the following discussion, assume that the scale of the acquired image is such that signal cells are K×K color cells.

Figure 46:
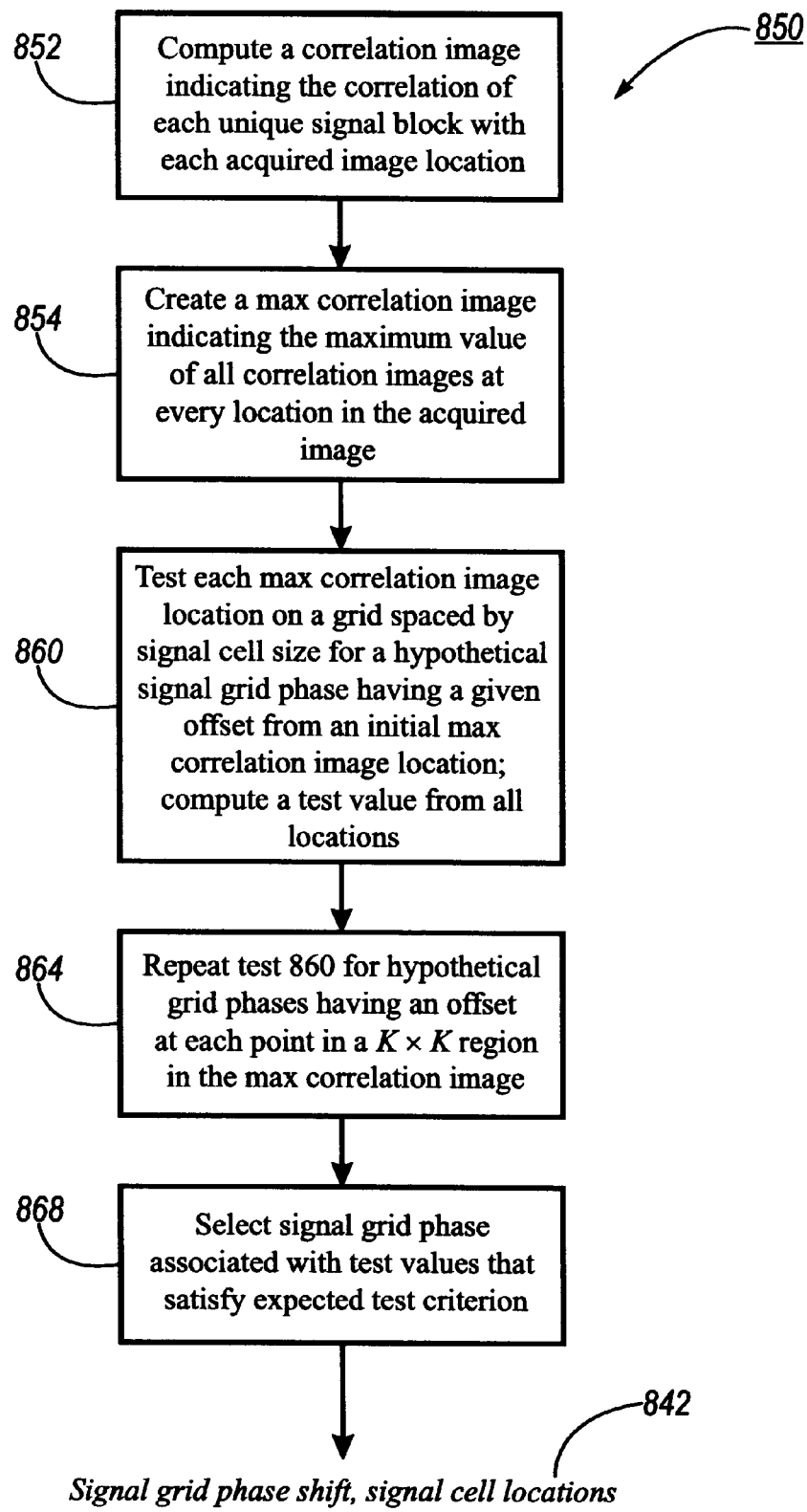
FIG. 46 is a flowchart illustrating an embodiment of the synchronization operation specified in FIG. 43 for locating the received signal cells in an acquired image during a decoding operation.

The process of finding the signal grid in the acquired image proceeds as shown in the flowchart of operation 850 of FIG. 46. In box 852 a correlation image is computed for each unique signal block to be decoded in the acquired image. The correlation image indicates the correlation between (i.e., the inner product of) an image region centered at each location in the acquired image and a first unique signal block; there will be one correlation image for each unique signal block. In each of these correlation images, there will be a high value in the locations where the acquired image contains the signal block being correlated; in that same location in the other correlated images, the value will be low because the other signal blocks are not present. To find the locations of all of the signal blocks, an image called the max correlation image is created, in box 854, that contains, for each image location, the maximum value of all of the correlation images at that location. As noted earlier, signal cells are each centered at points on a signal grid whose spacing is K×K color cells. However, the position of the origin of the grid is unknown, so it is necessary to find which of the K×K "phase shifts" aligns the signal grid with the actual location of the centers of the signal cells. In box 860, an initial "phase shift," denoted as an offset from an initial starting position or origin in the max correlation image, is hypothesized, and each grid location in the max correlation image is tested for its correlation as a possible signal cell location in the hypothesized signal grid. A testing filter is designed to identify a correct signal grid phase shift and a test value is computed from all locations in the hypothesized signal grid. The testing in box 860 is repeated, in box 864, for all possible hypothesized phase shifts of the signal grid in the acquired image. The signal grid phase shift that best satisfies the expected test criterion is selected, in box 868, as the actual signal grid phase shift, producing the locations 842 of the signal cells in the acquired image.

A proposed testing filter used to locate the signal grid in the illustrated embodiment is described as follows. When a signal block is centered over a signal cell in the acquired image, the value of its inner product would be expected to be $\pm K^2 \delta^2$. Therefore, subtracting $K^2 \delta^2$ from the value in the max correlation image at all of the image locations in the max correlation image that are true grid points (i.e., centers of signal blocks) would result in low values for a correctly hypothesized grid position. Thus, the grid offset or phase shift that minimizes the sum of the squares of this difference over all grid locations locates the signal grid.

It should be noted that there is subtlety to synchronizing the signal grid with the received signal cells in the acquired image that may not be immediately apparent. For any given image region in the acquired image, in order to determine which signal block is there it is necessary to subtract off the local average color of the image region the signal block occupies, but the correct local average color for the image region can't really be accurately determined unless the signal grid is synchronized to valid signal blocks. A digital filter may be designed to compute and subtract the local image average, and correlate the result with the set of valid signal blocks.

This filter design and its use in synchronization operation 850 are described in a mathematical formulation as follows. Let $\vec{S}[m,n]$ be the acquired image. Let a[m,n] be a K×K kernel of constant value $1/K^2$ and symmetric about the origin. Let $$\vec{S}'_K[m,n] = \sum_{i=-K/2}^{+K/2} \sum_{j=-K/2}^{+K/2} \vec{S}[m-i, n-j]a[m,n] \quad (11)$$

be the correlation of $\vec{S}[m,n]$ with a[m,n]. Each point in $\vec{S}'_K[m,n]$ is the average of the region centered at the corresponding point in $\vec{S}[m,n]$. The signal block set $\vec{s}[m,n]$ is then correlated with $\vec{S}'_K[m,n]$ to detect the presence of signal blocks in the acquired image, but because the signal blocks have zero mean color $\underline{0}$, this is equivalent to the correlation $$\vec{M}_l[m,n] = \sum_{i=-K/2}^{+K/2} \sum_{j=-K/2}^{+K/2} (\vec{s}_l[i,j])^t \vec{S}[m-i, n-j]. \quad (12)$$

When $\vec{s}_l[i,j]$ is centered over a signal cell in acquired image $\vec{S}[m,n]$, the inner product of this region with the acquired image is expected to have the value $\pm K^2 \delta^2$. Thus, the signal grid can be synchronized with the signal cells in the acquired image by finding the offset (u,v), u,v∈[-K/2, +K/2] that minimizes $$\sum_m \sum_n \left[ \left( \max_l \{ \vec{M}_l[m+u, n+v] \} \right) - K^2 \delta^2 \right]^2 \quad (13)$$

Note that correlation with kernels composed of constant rectangular subregions can be implemented efficiently using 2D cumulative sums of the acquired image.

d. Signal block identification

Once the signal grid in the acquired image is located, the locations of the signal cells that occur in the image are known. It is then possible to identify which one of the signal blocks occurs in each of the signal cells. Identification of the signal cells assumes that, for each signal cell, the local average color has been subtracted from the signal cell, leaving a received signal block with subregions of color difference quantities in each grid location. To determine which one of the signal blocks in the signal set each received signal block is, the inner (dot) product of each valid signal block in the expected signal set with each received signal block in the acquired image is computed; the inner product of a received signal cell with each valid signal block in the signal set having the highest value identifies the valid signal block as the one encoded at that location. The message value paired with the identified signal block is then available for storing in a message data structure for constructing recovered message 898 (FIG. 43). Note that in most applications of the decoding technique, the signal cells will be arranged in an expected order in the acquired image such that the message values, when decoded from the received signal blocks and put in the expected order, form a message. The message values decoded from all of the signal cells, when arranged in the expected order, produce the message encoded in the acquired image. However, there is no requirement for use of the decoding technique that the signal cells be arranged in any expected order.

Note that when the size of the signal set (i.e., the number of signal blocks) is much larger than the number of basis vectors, identifying the encoded signal blocks in the signal cells is more efficiently accomplished by finding a correlation directly between the received signal blocks and the basis vectors. So, for example, when there are four basis vectors, or basis blocks, these produce a total of sixteen (16) signal blocks, as shown in FIG. 39. The received signal vector for each received signal block can be computed by computing the dot product of each received signal block with each of the four basis vectors (i.e., the four basis blocks) to produce the coefficients of the received signal vector. Then compute the dot product of the received signal vector for each of the received signal blocks and each signal vector $\vec{s}_i$ and choose the minimal value among those computations. This is equivalent to computing the correlation between each of the sixteen signal blocks and each of the received signal blocks, but with far fewer computations.

e. Decoding and color space directions

The discussion of decoding above assumes that the set of expected valid unique signal blocks, $\{\vec{s}_0, \vec{s}_1, \ldots, \vec{s}_{M-1}\}$, are fully specified, meaning that both the signal block modulation pattern and the color space direction of modulation are known. Complete specification of the expected signal blocks is required in order to perform the correlation computations necessary in both the grid synchronization and signal block identification operations. When encoding has been implemented using a fixed and constant color space direction, complete specification of the signal blocks can be made at the start of the decoding operation. However, when a color space direction has been computed for each image reference color in the encoded image, complete specification of the set of signal blocks expected in the acquired image must be made part of the decoding process. This is because the color space direction of an encoded signal block is a function of its reference color (i.e., the color of the image region the signal block occupies in the encoded image.) Thus, during any correlation operation that correlates a signal block with a region of the acquired image that is a proposed or actual signal cell or received signal block, the color space direction must be computed as follows. For the region of the acquired image that is input to the correlation operation, compute the average color of that image region and call that average color the reference color. Compute a color space direction and modulation amplitude using the reference color according to any suitable method. Then compute the expected signal block, $\vec{s}_i[p,q]$, by multiplying the computed color space direction and magnitude by the signal block modulation pattern. Then perform the correlation (i.e., compute the dot product) using the now fully-specified set of valid signal blocks.

f. Decoding one-dimensional signal blocks

The technique for decoding 1D signal cells of the type illustrated in FIGS. 13 and 14 is analogous to the decoding of 2D signal cells just described. In the case of a color image that has been encoded with 1D signal blocks, the acquired image is merely a slice of the encoded color image that spans the dimension that carries the message. A bar scanner or scanning wand may be used to produce such a slice. After finding alignment and scale of the acquired image slice, decoding involves synchronizing 1D signal cells with valid 1D signal blocks. The synchronization process is much less complex than that of the 2D signal grid synchronization but is performed in much the same manner. Once the signal cell portions have been synchronized, signal block identification proceeds in the same manner described above, using correlation operations.

9. The machine and software product of the invention

Figure 47:
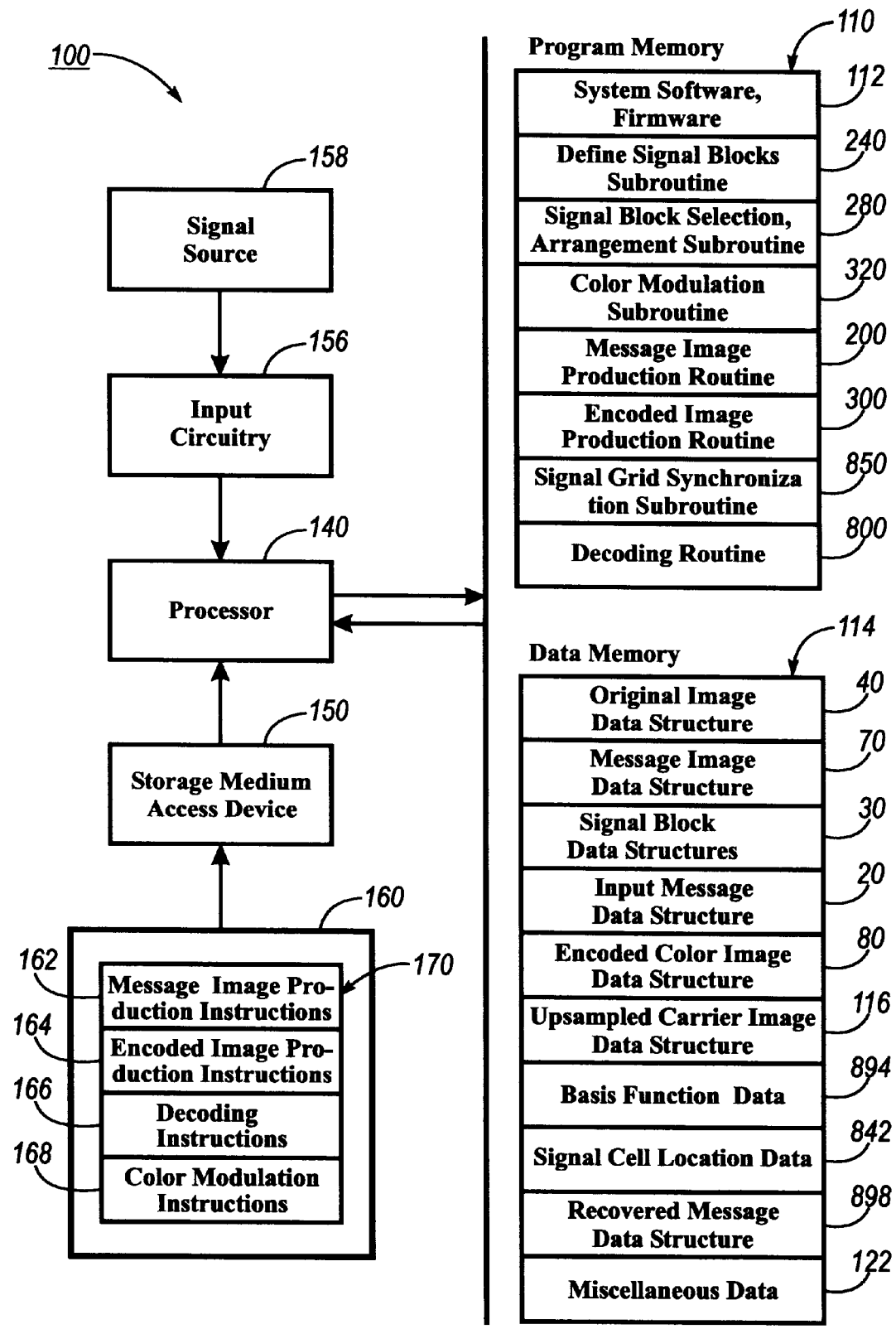
FIG. 47 is a simplified block diagram illustrating a suitably configured machine in which the present invention may be used, and further illustrating the software product of the present invention and its use in conjunction with the machine.

FIG. 47 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody the present invention, the machine is not a standard or known configuration.

Machine 100 may be configured to perform operations 200 and 300 of FIG. 1 to encode data in a color image using color-modulated signal blocks. Machine 100 may also be configured to perform operation 800 of FIG. 43 to decode encoded message signals from an acquired image. Note that machine 100 in FIG. 47 is shown as being configured to perform both encoding and decoding operations by way of illustration only. It is to be understood that machine 100 may be configured to perform only one of the encoding and decoding operations. An input color image, such as original color image 40 of FIG. 1, color image 42 of FIG. 6, or acquired color image 802 of FIG. 43, is provided from signal source 158. Signal source 158 may be a memory device, a communications channel, a data bus, another processor performing an operation, or any other suitable source of color image signals. For example, signal source 158 may be an image capture device, such as a scanning device, a digital camera, or an interface device that produces a digital image definition data structure from another type of image signal. An input color image provided by signal source 158 is forwarded via input circuitry 156 to processor 140 and may be stored in data memory 114. Machine 100 may, but need not, include a conventional display device (not shown) capable of presenting images, such as a cathode ray tube, a liquid crystal display (LCD) device, a printing device, or any other device suitable for presenting images.

Processor 140 operates by accessing program memory 110 to retrieve instructions, which it then executes. When machine 100 is configured to perform operations 200 and 300 to encode a message in a color image to produce an encoded image, program memory 110 includes memory image production instructions 200 that implement the functions shown in flowchart 200 of FIG. 3 and encoded image production instructions 300 of FIG. 5. Program memory 110 includes instructions for the subroutines needed to produce the message image having the uniquely-patterned signal blocks arranged to represent the input message according to instructions 200. These include instructions 240 for defining the signal blocks and signal block selection and arrangement instructions 280. Program memory 110 also includes instructions for subroutines needed to upsample the carrier image and combine the carrier image with the message image, according to instructions 300; these include color modulation instructions 320 when the software is configured to determine color modulations for individual signal blocks (as opposed to using a constant, predetermined ±$\underline{\delta}$ modulation.)

Similarly, when machine 100 is configured to perform decoding operation 800, program memory 110 includes decoding instructions 800 that implement the functions shown in the flowchart of FIG. 43, and also includes instructions for the subroutines needed to decode the message from an acquired color image such as subroutine 850 shown in the flowchart of FIG. 46.

During execution of the instructions, processor 140 may access data memory 114 to obtain or store data necessary for performing its operations. For example, when machine 100 is configured to perform operation 200 for producing a message image given an input message, data memory 114 stores the image data structures 80 defining the signal blocks and data structure 20 indicating the input message to be encoded, as well as message image data structure 70. Data memory 114 also stores upsampled carrier image data structure 116 that is to be combined with message image data structure 70. Data memory 114 also stores various other miscellaneous data such as data needed by color modulation subroutine 320, if machine 100 is so configured. Similarly, when machine 100 is configured to perform decoding operation 800, data memory 114 stores data 30 defining the signal blocks that are expected to occur in an encoded image, the vector-valued basis functions 894 that define the signal blocks, data 842 indicating signal cell locations and sizes that are produced as a result of synchronization of the grid with signal cell centers, and recovered message 898. Data memory 114 further stores various other miscellaneous data needed by decoding operation 800, when machine 100 is so configured.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

FIG. 47 also shows software product 160, an article of manufacture that can be used in a machine that includes components like those shown in machine 100. Software product 160 includes data storage medium 170 that can be accessed by storage medium access circuitry 150. Data storage medium 170 stores instructions for executing one or more of operation 200 and 300 of FIG. 1, operation 800 of FIG. 43, or operation 320 of FIG. 5, and may also include instructions for performing these operations according to the illustrated embodiments illustrated in FIGS. 3 and 5.

Software product 160 may be commercially available to a consumer in the form of a shrink-wrap package that includes data storage medium 170 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 170 is inserted in order for the storage medium access circuitry to access the data stored thereon. Examples of storage medium access devices include disk drives, CD-ROM readers, and DVD devices. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 170 when data storage medium 170 is stored as part of a remotely-located storage device, such as a server. Software product 160 may be commercially or otherwise available to a user in the form of a data stream indicating instruction data for performing the method of the present invention that is transmitted to the user over a communications facility from the remotely-located storage device. In the latter case, article 160 is embodied in physical form as signals stored on the remotely-located storage device; the user purchases or accesses a copy of the contents of data storage medium 170 containing instructions for performing the present invention, but typically does not purchase or acquire any rights in the actual remotely-located storage device. When software product 160 is provided in the form of a data stream transmitted to the user over a communications facility from the remotely-located storage device, instruction data stored on data storage medium 170 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

FIG. 47 shows data storage medium 170 configured for storing instruction data for performing operations 200 and 300 (FIGS. 1, 3 and 5), and operation 800 (FIG. 43). This instruction data is provided to processor 140 for execution when the technique for encoding message data in a color image is to be used. The stored data includes message image production and encoded image production instructions 162 and 164; when these instructions are provided to processor 140, and processor 140 executes them, the machine is operated to perform the operations for imperceptibly encoding message data into an original color image, as represented in the flowchart of FIG. 1. For example, the stored data include message image production instructions 162. When instructions 162 are provided to processor 140, processor 140 executes them, causing the machine to perform the operations for defining signal blocks and for selecting and spatially arranging signal blocks into the message image according to the input message data, as represented in the flowchart of FIG. 3. The stored data shown also include encoded image production instructions 164; when these instructions are provided to processor 140, and processor 140 executes them, the machine is operated to perform the operations for producing an encoded image, as represented in the flowchart of FIG. 5.

With continued reference to FIG. 47, the data stored on data storage medium 170 further includes instruction data 166 indicating decoding instructions for decoding the signal blocks embedded in an acquired color image. When these instructions are provided to processor 140, processor 140 executes them, causing the machine to perform decoding operation 800, as represented in the flowchart of FIG. 43. The data stored on data storage medium 170 further includes color modulation instruction data 168 indicating instructions for determining the appropriate color space direction and color modulation for a given input color. When these instructions are provided to processor 140, and processor 140 executes them, the machine is operated to perform the operations described in U.S. patent application Ser. No. 08/956,326, or an operation with the equivalent functionality, as described in the discussion in Section 3.b above.

A software implementation of an embodiment of the present invention was written in Allegro Common Lisp version 4.3 (available from Franz in Berkeley Calif.) and in C code and executes on a Silicon Graphics workstation model O2, available from Silicon Graphics Incorporated of Mountain View Calif. Encoded images were printed on a Xerox Majestik color printer model 57 60. Printed encoded images were scanned for decoding purposes using a Hewlett Packard Scanjet model 4C image scanner.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A method for operating a processor-controlled machine to produce an output color image having at least one message data item indicating data encoded therein; the machine including a processor and a memory device for storing data; the data stored in the memory device including instruction data the processor executes to operate the machine; the processor being connected to the memory device for accessing and executing the instruction data stored therein; the method comprising:

obtaining a message data item indicating a message value; the message value being one of an expected set of valid message values in a predetermined coding scheme;

selecting a modulation pattern data structure representing the message value of the message data item; a selected modulation pattern data structure being one of a plurality of modulation pattern data structures each uniquely representing one of the valid message values in the coding scheme; each modulation pattern data structure defining size dimensions of an output signal block color image and including at least two different data values spatially arranged in a pattern indicating image locations in the output signal block color image of at least two colors produced by applying a color difference quantity to an unspecified reference color;

obtaining an output color value as the unspecified reference color;

obtaining the color difference quantity using the output color value;

producing an output signal block color image using the output color value, the color difference quantity and the selected modulation pattern data structure; the output signal block color image having size dimensions indicated by the modulation pattern data structure and including a spatially arranged pattern of color modulated image regions having color values produced by modulating the output color value by the color difference quantity subject to a requirement that the output color value be an average color of all of the color values of the color modulated image regions; and producing an output color image including the output signal block color image as an image region therein.

2. The method of claim 1 for operating a processor-controlled machine to produce an output color image wherein obtaining the color difference quantity includes using the output color value to compute, in a multi-dimensional color space, a color space direction and associated color modulation magnitude that together define an additive change in the output color value;

the at least two different data values spatially arranged in the modulation pattern data structure indicate scaling data; and modulating the output color value by the color difference quantity includes generating the color values of the spatially arranged pattern of color modulated image regions by varying the output color value by the additive change scaled by the scaling data.

3. The method of claim 2 wherein the color difference quantity is a single color space direction and associated color modulation magnitude for all image locations in the output signal block color image; the color space direction and associated color modulation magnitude being computed so that the color values of the color modulated image regions included in the output signal block color image are simultaneously capable of being detected by a digital image capture device and are visually substantially imperceptible to a human viewer of the output signal block color image; the spatially arranged pattern of color modulated image regions in the output signal block color image thereby being substantially imperceptible to the human viewer.

4. The method of claim 2 wherein the output color image is a gray scale image, the output color value is a color included in a set of gray scale colors that ranges from black to gray to white, and the color difference quantity is a single color space direction and associated color modulation magnitude indicating the set of gray scale colors; the color values of the color modulated image regions included in the output signal block color image thereby all being included in the set of gray scale colors.

5. The method of claim 2 wherein the color difference quantity is a function of an image location in the modulation pattern data structure such that the color space direction and associated color modulation magnitude applied to the output color value varies by image location in the output signal block color image, subject to a requirement that the output color value is an average color of all of the color values of the color modulated image regions in the output signal block color image.

6. The method of claim 1 for operating a processor-controlled machine to produce an output color image further including, when the message data item indicates plural message values, and after encoding a first one of the plural message values to produce a first output signal block color image, repeating, for each remaining message value of the plural message values, the selecting, obtaining and producing the output signal block color image steps to produce plural additional output signal block color images;

wherein producing each of the plural output signal block color images includes using, as a color difference quantity, one of a plurality of orthogonal color space directions and associated color modulation magnitudes occurring in a multi-dimensional color space; each orthogonal color space direction and associated magnitude together defining an additive change in the output color value; and additively combining the first and the plural additional output signal block color images to produce a combined output signal block color image encoding the plural message values in the output color image.

7. The method of claim 6 wherein a total number of message values that may be encoded in a single output signal block color image is a function of a total number of modulation pattern data structures and a total number of orthogonal color space directions and associated color modulation magnitudes computed using the output color value.

8. The method of claim 1 for operating a processor-controlled machine to produce an output color image wherein obtaining the color difference quantity includes assigning as the color difference quantity a predetermined color space direction and associated color modulation magnitude in a multi-dimensional color space that together define a fixed, predetermined additive change in the output color value; wherein the at least two different data values spatially arranged in the modulation pattern data structure indicate scaling data; and wherein modulating the output color value by the color difference quantity includes generating the color values of the spatially arranged pattern of color modulated image regions by varying the output color value by the fixed, predetermined additive change scaled by the scaling data.

9. The method of claim 1 for operating a processor-controlled machine to produce an output color image wherein the plurality of output signal block color images are arranged in the output color image in a two-dimensional array.

10. The method of claim 1 for operating a processor-controlled machine to produce an output color image wherein the plurality of output signal block color images are arranged in the output color image so that data is encoded only in a single dimension thereof.

11. The method of claim 1 for operating a processor-controlled machine to produce an output color image wherein the output color image is generated as a plurality of output signal block color images each having data encoded therein.

12. The method of claim 1 for operating a processor-controlled machine to produce an output color image further including receiving an input color image; and wherein obtaining an output color value as the unspecified reference color includes obtaining the output color value from an image region of the input color image.

13. The method of claim 12 wherein the output color image is a version of the input color image having data encoded therein; and wherein producing the output color image including the output signal block color image includes replacing the image region of the input color image with the output signal block color image.

14. The method of claim 1 for operating a processor-controlled machine to produce an output color image wherein the predetermined coding scheme is a binary coding scheme composed of two valid message values; the plurality of modulation pattern data structures including at most first and second modulation pattern data structures each representing one of the two valid message values.

15. A method for operating a processor-controlled machine to produce an output color image having at least one message data item indicating data encoded therein; the machine including a processor and a memory device for storing data; the data stored in the memory device including instruction data the processor executes to operate the machine; the processor being connected to the memory device for accessing and executing the instruction data stored therein; the method comprising:

obtaining a message data item indicating a message value; the message value being one of an expected set of valid message values in a predetermined coding scheme;

selecting a signal block data structure representing the message value of the message data item; a selected signal block data structure being one of a plurality of signal block data structures each uniquely representing one of the valid message values in the coding scheme; each signal block data structure defining size dimensions of an output signal block color image and including data indicating a predetermined color space direction and associated color modulation magnitude in a multi-dimensional color space specifying a color difference quantity; each signal block data structure further including scaling data indicating a spatially arranged modulation pattern specifying image locations in the output signal block color image of scaled color difference quantities produced by applying the scaling data to the predetermined color space direction and associated color modulation magnitude;

obtaining an output color value;

producing an output signal block color image using the output color value and the selected signal block data structure indicating the predetermined color space direction and the modulation pattern; the output signal block color image having a spatially arranged pattern of color modulated image regions each having a color value produced by modulating the output color value by the color space direction and the associated color modulation magnitude according to the scaling data indicating the modulation pattern, subject to a requirement that the output color value be an average color of all of the color values of the color modulated image regions; and producing an output color image including the output signal block color image as an image region therein.

16. A method for operating a processor-controlled machine to encode a plurality of message data items in an encoded color image version of an input color image so that the message data items are visually substantially imperceptible to a human viewer; the machine including a processor and a memory device for storing data; the data stored in the memory device including instruction data the processor executes to operate the machine; the processor being connected to the memory device for accessing and executing the instruction data stored therein; the method comprising:

receiving an input color image data structure including a plurality of subregions;

obtaining a plurality of ordered message data items having a predetermined order and each indicating a message value; the message value being one of an expected set of valid message values in a predetermined coding scheme;

for each ordered message data item, in the predetermined order thereof, producing an output signal block color image, including selecting a signal block data structure representing the message value of the message data item; a selected signal block data structure being one of a plurality of signal block data structures each uniquely representing one of the valid message values in the coding scheme; each signal block data structure defining size dimensions of an output signal block color image and including variable data a color difference quantity; each signal block data structure further including scaling data indicating a spatially arranged modulation pattern specifying image locations in the output signal block color image of scaled color difference quantities produced by applying the scaling data to the color difference quantity;

determining an input color value of one of the subregions of the input color image;

obtaining the color difference quantity using the input color value;

producing an output signal block color image using the input color value, the color difference quantity and the selected signal block data structure; the output signal block color image having a spatially arranged pattern of color modulated image regions each having a color value produced by modulating the input color value by the color difference quantity according to the scaling data indicating the modulation pattern, subject to a requirement that the input color value be an average color of all of the color values of the color modulated image regions; and replacing the subregion in the input color image with the output signal block color image;

the encoded color image version of the input color image being produced by replacing the subregions of the input color image with the output signal block color images in the predetermined order of the ordered message data items; the encoded color image being perceived by a human viewer to be substantially identical in appearance to the original color image.

17. The method of claim 16 for operating a processor-controlled machine to encode a plurality of message data items in an encoded color image version of an input color image wherein obtaining the color difference quantity includes using the input color value to compute, in a multi-dimensional color space, a color space direction and color modulation magnitude that together define an additive change in the input color value;

the at least two different data values spatially arranged in the modulation pattern data structure indicate scaling data; and modulating the input color value by the color difference quantity includes generating the color values of the spatially arranged pattern of color modulated image regions by varying the input color value by the additive change scaled by the scaling data.

18. The method of claim 16 for operating a processor-controlled machine to encode a plurality of message data items in an encoded color image version of an input color image wherein the plurality of output signal block color images are arranged in the encoded color image in a two-dimensional array.

19. The method of claim 16 for operating a processor-controlled machine to encode a plurality of message data items in an encoded color image version of an input color image wherein the plurality of output signal block color images are arranged in the encoded color image so that data is encoded only in a single dimension thereof.

20. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, obtaining at least one message data item indicating a message value; the message value being one of an expected set of valid message values in a predetermined coding scheme;

the processor, further in executing the instructions, selecting a modulation pattern data structure representing the message value of the at least one message data item; a selected modulation pattern data structure being one of a plurality of modulation pattern data structures each uniquely representing one of the valid message values in the coding scheme; each modulation pattern data structure defining size dimensions of an output signal block color image and including at least two different data values spatially arranged in a pattern indicating image locations of at least two colors produced by applying a color difference quantity to an unspecified reference color in the output signal block color image;

the processor, further in executing the instructions, obtaining an output color value as the unspecified reference color;

the processor, still further in executing the instructions, obtaining the color difference quantity using the output color value;

the processor, further in executing the instructions, producing an output signal block color image using the output color value, the color difference quantity and the selected modulation pattern data structure; the output signal block color image having a spatially arranged pattern of image regions having color values produced by modulating the output color value by the color difference quantity subject to a requirement that the output color value be an average color of all of the color values of the color modulated image regions;

the processor, still further in executing the instructions, producing an encoded color image including the output signal block color image as an image region therein.

* * * * *